US012087035B2

(12) United States Patent
Miyagawa et al.

(10) Patent No.: US 12,087,035 B2
(45) Date of Patent: Sep. 10, 2024

(54) INFORMATION PROCESSING SYSTEM, INFORMATION PROCESSING METHOD, AND COMPUTER PROGRAM

(71) Applicant: NEC Corporation, Tokyo (JP)

(72) Inventors: Taiki Miyagawa, Tokyo (JP); Akinori Ebihara, Tokyo (JP)

(73) Assignee: NEC CORPORATION, Tokyo (JP)

(*) Notice: Subject to any disclaimer, the term of this patent is extended or adjusted under 35 U.S.C. 154(b) by 244 days.

(21) Appl. No.: 17/640,183

(22) PCT Filed: Sep. 3, 2020

(86) PCT No.: PCT/JP2020/033474
§ 371 (c)(1),
(2) Date: Mar. 3, 2022

(87) PCT Pub. No.: WO2022/049704
PCT Pub. Date: Mar. 10, 2022

(65) Prior Publication Data
US 2022/0415018 A1 Dec. 29, 2022

(51) Int. Cl.
G06V 10/764 (2022.01)
G06V 10/72 (2022.01)
G06V 30/19 (2022.01)

(52) U.S. Cl.
CPC .......... G06V 10/764 (2022.01); G06V 10/72 (2022.01); G06V 30/19173 (2022.01)

(58) Field of Classification Search
CPC ...... G06V 10/764; G06V 10/72; G06V 10/62; G06V 30/19173; G06V 40/40; G06V 40/172; G06F 16/906; G06T 7/00
See application file for complete search history.

(56) References Cited

U.S. PATENT DOCUMENTS 11,600,003 B2 * 3/2023 Sugimoto .............. G16H 50/30
2006/0161531 A1 * 7/2006 Khandelwal ...... G06F 16/90335
707/E17.14

(Continued)

FOREIGN PATENT DOCUMENTS

JP 5061382 B 10/2012
JP 2017-040616 A 2/2017
JP 2017-156148 A 9/2017

OTHER PUBLICATIONS

Extended European Search Report for EP Application No. 20952441.2, dated on Aug. 11, 2023.

(Continued)

*Primary Examiner* — John B Strege
(74) *Attorney, Agent, or Firm* — Sughrue Mion, PLLC

(57) ABSTRACT

An information processing system (10) includes: an acquisition unit (50) configured to sequentially acquire a plurality of elements included in sequential data; a first calculation unit (110) configured to calculate, for each of the plurality of elements, a first indicator indicating which one of a plurality of classes the element belongs to; a weight calculation unit (130) configured to calculate, for each of the plurality of elements, a weight according to a confidence related to calculation of the first indicator; a second calculation unit (120) configured to calculate, based on the first indicators each weighted with the weight, a second indicator indicating which one of the plurality of classes the sequential data belongs to; and a classification unit (60) configured to classify the sequential data as any one of the plurality of classes, based on the second indicator. According to such an information processing system, sequential data can be appropriately classified.

9 Claims, 14 Drawing Sheets

(56) References Cited

U.S. PATENT DOCUMENTS

| | | | |
|---|---|---|---|
| 2014/0056490 A1* | 2/2014 | Kawahara | G06V 40/171 |
| | | | 382/118 |
| 2017/0109448 A1* | 4/2017 | Adamy | G06F 16/24578 |
| 2018/0276845 A1 | 9/2018 | Bjorgvinsdottir et al. | |
| 2018/0285668 A1* | 10/2018 | Li | G06F 18/21 |
| 2021/0035015 A1* | 2/2021 | Edgar | G06F 18/211 |
| 2021/0209207 A1* | 7/2021 | Lee | G06F 18/22 |
| 2021/0357677 A1* | 11/2021 | Hirayama | G06N 3/08 |
| 2021/0390697 A1* | 12/2021 | Marder Gilboa | G06F 18/2413 |

OTHER PUBLICATIONS

International Search Report for PCT Application No. PCT/JP2020/033474, mailed on Oct. 20, 2020.
Ebibara Akinori F. et al., "Deep Neural Networks for the Sequential Probability Ratio Test On Non-I.I.D. DTA Series", [online], Cornell University, Jun. 17, 2020, pp. 1-56, [retrieval date: Oct 8. 2020], Internet <URL:https://arxiv.org/abs/2006.05587>.

* cited by examiner (a)

DEGREE OF CLARITY: HIGH,
RELIABILITY: HIGH (b)

DEGREE OF CLARITY: LOW,
RELIABILITY: LOW (a)

DISTANCE: CLOSE,
RELIABILITY: HIGH (b)

DISTANCE: FAR,
RELIABILITY: LOW

INFORMATION PROCESSING SYSTEM, INFORMATION PROCESSING METHOD, AND COMPUTER PROGRAM

This application is a National Stage Entry of PCT/JP2020/033474 filed on Sep. 3, 2020, the contents of all of which are incorporated herein by reference, in their entirety.

TECHNICAL FIELD

The present disclosure relates to a technical field of an information processing system, an information processing method, and a computer program that process information related to, for example, biometric authentication.

BACKGROUND ART

As a system of this type, there is known a system that uses sequential probability ratio test (SPRT). For example, Patent Reference 1 discloses a technique that selects any one of "target detected", "target not detected", and "indeterminant" by using SPRT. Patent Reference 2 discloses a technique that identifies which a plurality of inputted time-series data belong to, registered oneself or another object. In the patent references, a log likelihood ratio (LLR) for the whole series is used.

CITATION LIST

Patent Literature

Patent Reference 1

Japanese Patent Laid-Open No. 2017-040616 A

Patent Reference 2

Japanese Patent No. 5061382 B

SUMMARY

Technical Problem

The present disclosure improves the related techniques described above.

Solution to Problem

An information processing system according to an example aspect of the present invention includes: an acquisition unit configured to sequentially acquire a plurality of elements included in sequential data; a first calculation unit configured to calculate, for each of the plurality of elements, a first indicator indicating which one of a plurality of classes the element belongs to; a weight calculation unit configured to calculate, for each of the plurality of elements, a weight according to a confidence related to calculation of the first indicator; a second calculation unit configured to calculate, based on the first indicators each weighted with the weight, a second indicator indicating which one of the plurality of classes the sequential data belongs to; and a classification unit configured to classify the sequential data as any one of the plurality of classes, based on the second indicator.

An information processing method according to an example aspect of the present invention includes: sequentially acquiring a plurality of elements included in sequential data; calculating, for each of the plurality of elements, a first indicator indicating which one of a plurality of classes the element belongs to; calculating, for each of the plurality of elements, a weight according to a confidence related to calculation of the first indicator; calculating, based on the first indicators each weighted with the weight, a second indicator indicating which one of the plurality of classes the sequential data belongs to; and classifying the sequential data as any one of the plurality of classes, based on the second indicator.

A computer program according to an example aspect of the present invention allows a computer to: sequentially acquire a plurality of elements included in sequential data; calculate, for each of the plurality of elements, a first indicator indicating which one of a plurality of classes the element belongs to; calculate, for each of the plurality of elements, a weight according to a confidence related to calculation of the first indicator; calculate, based on the first indicators each weighted with the weight, a second indicator indicating which one of the plurality of classes the sequential data belongs to; and classify the sequential data as any one of the plurality of classes, based on the second indicator.

DESCRIPTION OF EXAMPLE EMBODIMENTS

Hereinafter, embodiments of an information processing system, an information processing method, and a computer program will be described with reference to drawings.

First Embodiment

An information processing system according to a first embodiment is described with reference to FIGS. 1 to 3.

Hardware Configuration

First, a hardware configuration of the information processing system according to the first embodiment is described with reference to FIG. 1. FIG. 1 is a block diagram showing the hardware configuration of the information processing system according to the first embodiment.

Figure 1:
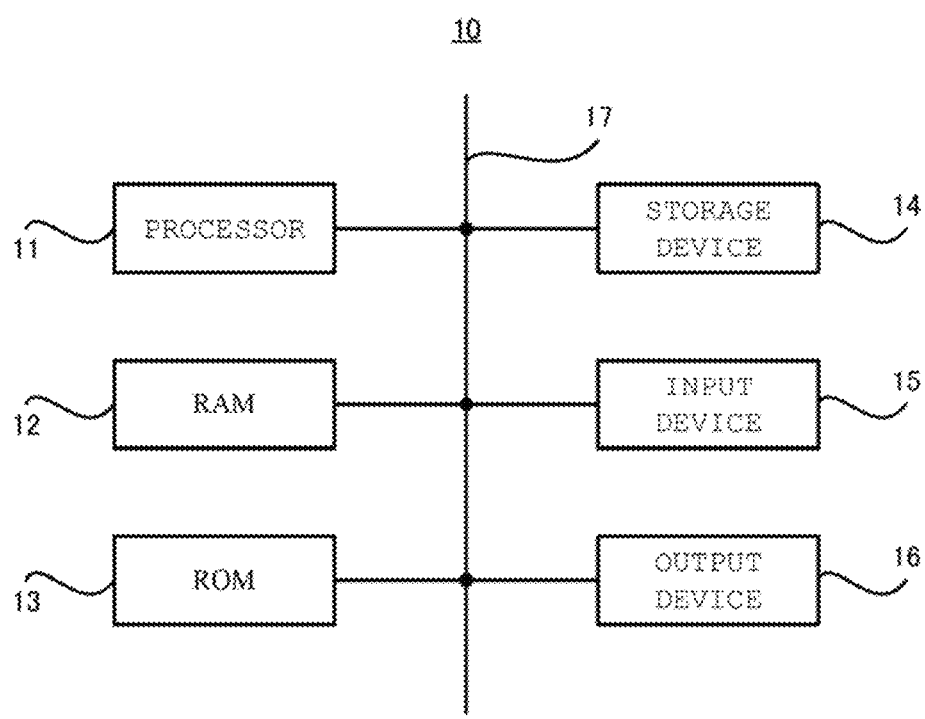
FIG. 1 is a block diagram showing a hardware configuration of an information processing system according to a first embodiment.

As shown in FIG. 1, the information processing system 10 according to the first embodiment includes a processor 11, a RAM (Random Access Memory) 12, a ROM (Read Only Memory) 13, and a storage device 14. The information processing system 10 may further include an input device 15 and an output device 16. The processor 11, the RAM 12, the ROM 13, the storage device 14, the input device 15, and the output device 16 are connected to each other through a data bus 17.

The processor 11 reads a computer program. For example, the processor 11 is configured to read the computer program stored in at least one of the RAM 12, the ROM 13, and the storage device 14. Alternatively, the processor 11 may read the computer program stored in a computer-readable recording medium, by using an undepicted recording media reader. The processor 11 may acquire (that is, may read) the computer program, via a network interface, from an undepicted device disposed outside of the information processing system 10. The processor 11 controls the RAM 12, the storage device 14, the input device 15, and the output device 16 by executing the read computer program. In the present embodiment in particular, when the processor 11 executes the read computer program, a functional block for classifying sequential data is implemented in the processor 11. Moreover, for the processor 11, one of a CPU (Central Processing Unit), a GPU (Graphics Processing Unit), an FPGA (field-programmable gate array), a DSP (Demand-Side platform), and an ASIC (Application Specific Integrated Circuit) may be used, or two or more thereof may be used in parallel.

The RAM 12 transitorily stores the computer program to be executed by the processor 11. The RAM 12 transitorily stores data transitorily used by the processor 11 when the processor 11 executes the computer program. The RAM 12 may be, for example, a D-RAM (Dynamic RAM).

The ROM 13 stores the computer program to be executed by the processor 11. The ROM 13 may store other fixed data. The ROM 13 may be, for example, a P-ROM (Programmable ROM).

The storage device 14 stores data that the information processing system 10 retains for a long time. The storage device 14 may operate as a transitory storage device for the processor 11. The storage device 14 may include at least one of, for example, a hard disk device, a magneto-optical device, an SSD (Solid State Drive), and a disk array device.

The input device 15 is a device that receives an input instruction from a user of the information processing system 10. The input device 15 may include at least one of, for example, a keyboard, a mouse, and a touch panel.

The output device 16 is a device that outputs information related to the information processing system 10 to the outside. For example, the output device 16 may be a display device (for example, a display) capable of displaying the information related to the information processing system 10.

Functional Configuration

Next, a functional configuration of the information processing system 10 according to the first embodiment is described with reference to FIG. 2. FIG. 2 is a block diagram showing the functional configuration of the information processing system according to the first embodiment.

Figure 2:
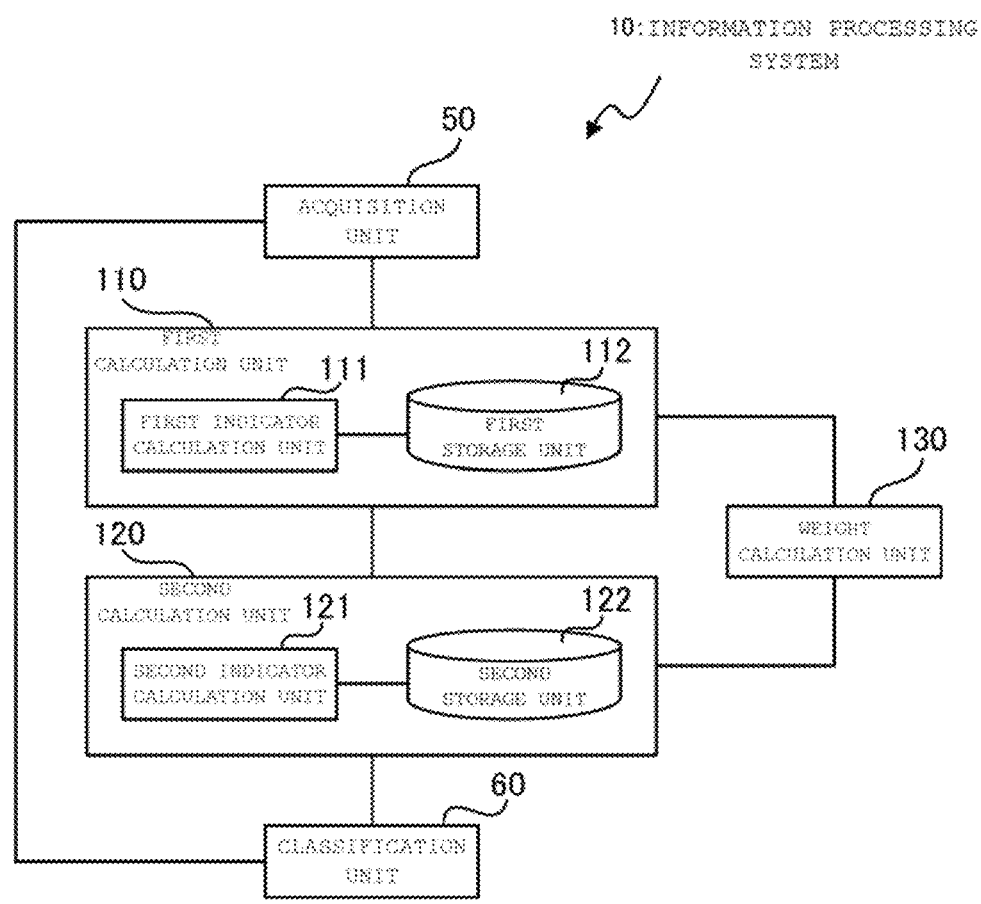
FIG. 2 is a block diagram showing a functional configuration of the information processing system according to the first embodiment.

As shown in FIG. 2, the information processing system 10 according to the first embodiment includes, as processing blocks for implementing functions of the information processing system 10, an acquisition unit 50, a first calculation unit 110, a second calculation unit 120, a weight calculation unit 130, and a classification unit 60. Note that each of the acquisition unit 50, the first calculation unit 110, the second calculation unit 120, the weight calculation unit 130, and the classification unit 60 may be implemented by the above-described processor 11 (see FIG. 1).

The acquisition unit 50 is configured to be able to sequentially acquire a plurality of elements included in sequential data. For example, the acquisition unit 50 acquires the plurality of elements one by one. The acquisition unit 50 may acquire the data directly from an arbitrary data acquisition device (for example, a camera or the like), or may read the data acquired in advance by a data acquisition device and stored in a storage or the like. A configuration is made such that each element of the sequential data acquired by the acquisition unit 50 is outputted to the first calculation unit 110.

The first calculation unit 110 includes a first indicator calculation unit 111 and a first storage unit 112. The first indicator calculation unit 111 is configured to be able to calculate a first indicator for an element acquired by the acquisition unit 50, by using the acquired element and a past first indicator. The "first indicator" here refers to an indicator indicating which one of a plurality of classes an element of the sequential data belongs to. Specific examples of the first indicator and a specific calculation method are described in detail in other embodiments, which will be described later. The first storage unit 112 is configured to be able to store a past first indicator calculated by the first indicator calculation unit 111, or a past element acquired by the acquisition unit 50. Information stored in the first storage unit 112 is configured to be able to be read by the first indicator calculation unit 111. When the first storage unit 112 stores a past first indicator, the first indicator calculation unit 111 may calculate a first indicator for an acquired element by reading the stored past first indicator. In contrast, when the first storage unit 112 stores an element acquired in the past, the first indicator calculation unit 111 may calculate a first indicator for an acquired element by calculating a past first indicator from the stored past element. A "class" may be one relating to "true" or "false" of an event of an object, or may be one relating to "presence" or "absence" of a specific attribute of an object. A class may be one relating to "positive" or "negative" of a state of an object. For example, a class may indicate whether a face of a person is real (true) or is disguised (masquerade) with a mask or the like (false). In another example, a class may indicate whether a person wears any accessory (presence) or does not (absence). In still another example, a class may be one relating to whether a person is in a good health condition (positive) or in a bad health condition (negative). However, the classes are not limited to the above-described examples.

The second calculation unit 120 includes a second indicator calculation unit 121 and a second storage unit 122. The second indicator calculation unit 121 is configured to be able to calculate a second indicator for an acquired element, by using a first indicator calculated by the first calculation unit 110 and a past second indicator. The "second indicator" here refers to an indicator indicating which one of the plurality of classes the sequential data belongs to. The second indicator calculated by the second calculation unit 120 is a value weighted with a weight calculated by the weight calculation unit 130. Specific examples of the second indicator and a specific calculation method are described in detail in the other embodiments described later. The second storage unit 122 is configured to be able to store a past second indicator calculated by the second indicator calculation unit 121. Information stored in the second storage unit 122 is configured to be able to be read by the second indicator calculation unit 121. The second indicator calculation unit 121 may calculate the second indicator for the acquired element by reading the past second indicator stored in the second storage unit 122.

The weight calculation unit 130 is configured to be able to calculate a weight used when a second indicator is calculated. The "weight" here is a value for adjusting a degree of influence that a first indicator used to calculate a second indicator and a past second indicator exert on the new second indicator to be calculated, and is calculated according to a confidence of an acquired element. For example, the weight is calculated as a value of a real number. The weight may be calculated in binary as to be "1" or "0". The "confidence" is a degree of confidence related to the calculation of the first indicator. For example, an element for which an appropriate first indicator is calculated has a high confidence, and an element for which an inappropriate first indicator is calculated has a low confidence. Specific examples of the confidence and a specific setting method are described in the other embodiments described later. Note that although the weight calculated by the weight calculation unit 130 is applied (that is, weighting is performed) when a second indicator is calculated, a timing of weighting is not particularly limited, and all required is that a second indicator ultimately calculated (more specifically, a second indicator used in classification by the classification unit 60) is weighted. Accordingly, the weight calculation unit 130 may weight an element of the sequential data at a timing when the element is acquired by the acquisition unit 50. Alternatively, the weight calculation unit 130 may weight an acquired element or a first indicator at a timing when the acquired element or the first indicator is stored in the first storage unit 112, or a timing when the acquired element or the first indicator is read from the first storage unit 112. Further alternatively, the weight calculation unit 130 may weight a second indicator at a timing when the second indicator is stored in the second storage unit 122, or a timing when the second indicator is read from the second storage unit 122.

The classification unit 60 classifies the sequential data as any one of the plurality of classes, based on the second indicator calculated by the second calculation unit 120. Note that the plurality of classes may be preset, and only two classes, or three or more classes, may be set. A specific classification scheme based on the second indicator is described in detail in the other embodiments described later. The classification unit 60 may include a function of instructing the acquisition unit 50 to further acquire an element when it cannot be determined which class the sequential data is classified as based on the second indicator.

Flow of Operation

Next, a flow of operation of the information processing system 10 according to the first embodiment is described with reference to FIG. 3. FIG. 3 is a flowchart showing the flow of the operation of the information processing system according to the first embodiment.

Figure 3:
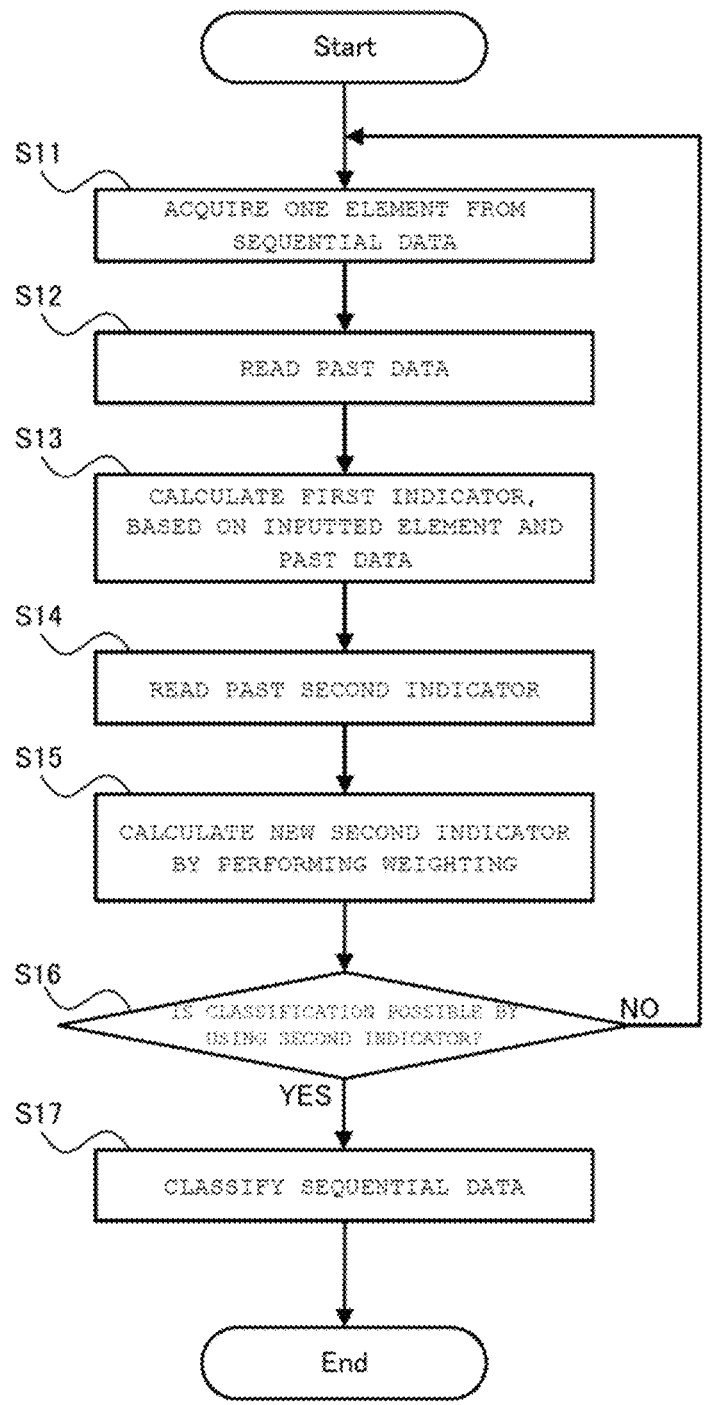
FIG. 3 is a flowchart showing a flow of operation of the information processing system according to the first embodiment.
Figure 4:
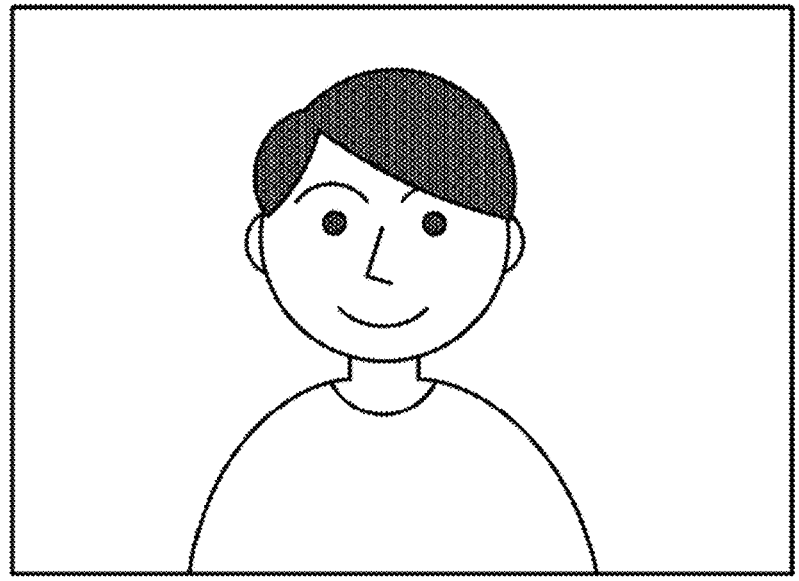
FIG. 4 is a diagram (version 1) showing examples of image data processed by an information processing system according to a second embodiment.
Figure 4:
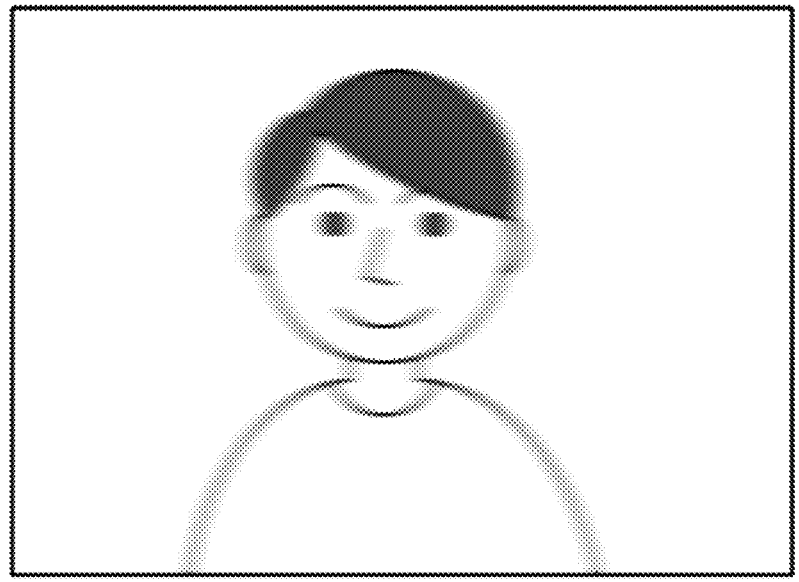
Figure 5:
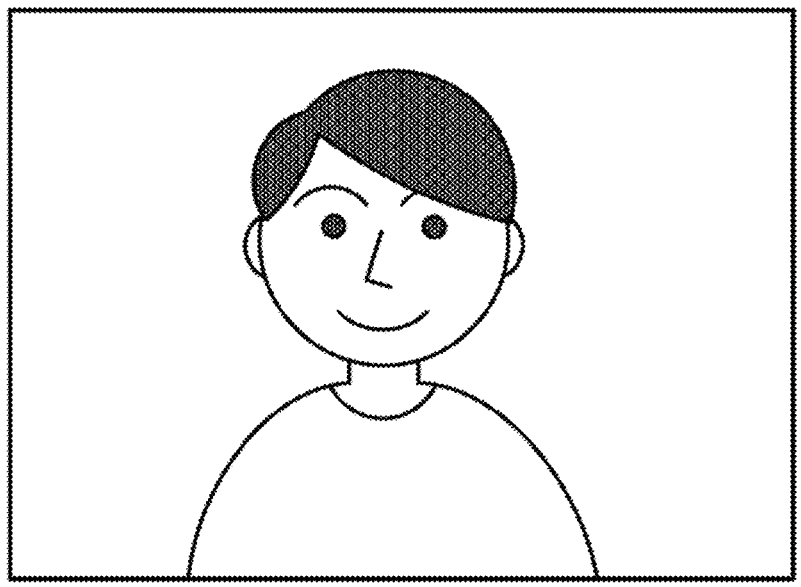
FIG. 5 is a diagram (version 2) showing examples of image data processed by the information processing system according to the second embodiment.
Figure 5:
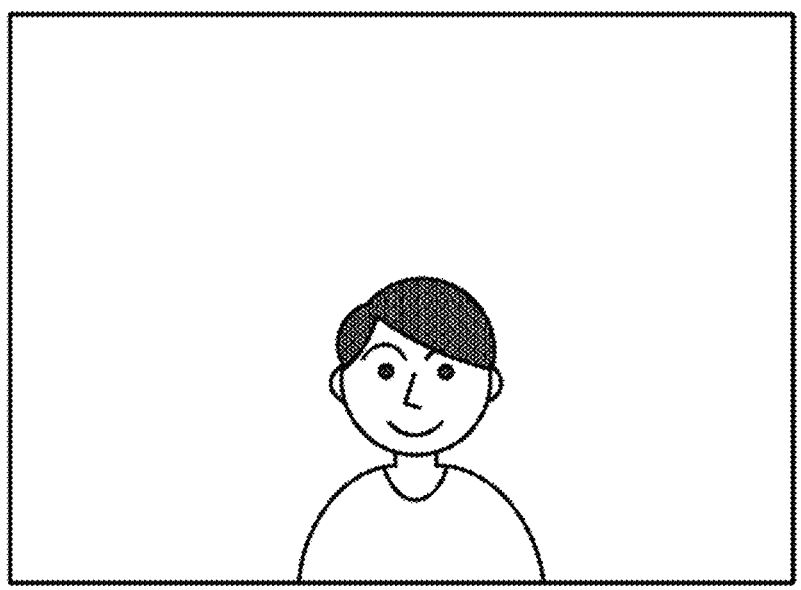

As shown in FIG. 3, in the information processing system 10 according to the first embodiment, first, the acquisition unit 50 acquires one element from sequential data (step S11). The acquisition unit 50 outputs the acquired element of the sequential data to the first calculation unit 110.

Subsequently, the first indicator calculation unit 111 in the first calculation unit 110 reads past data from the first storage unit 112 (step S12). For example, the past data may be a result of the process executed by the first indicator calculation unit 111 for an element acquired immediately prior to (in other words, a first indicator calculated for an element immediately prior to) the element acquired by the acquisition unit 50 for a current time. Alternatively, the past data may be the element itself acquired immediately prior to the element acquired by acquisition unit 50 for a current time.

Subsequently, the first indicator calculation unit 111 calculates a new first indicator (that is, a first indicator for the element acquired by the acquisition unit 50 for the current time), based on the element acquired by the acquisition unit 50 and the past data read from the first storage unit 112 (step S13). The first indicator calculation unit 111 outputs the calculated first indicator to the second calculation unit 120. The first indicator calculation unit 111 may store the calculated first indicator in the first storage unit 112.

Subsequently, the second indicator calculation unit 121 in the second calculation unit 120 reads a past second indicator from the second storage unit 122 (step S14). For example, the past second indicator may be a result of the process executed by the second indicator calculation unit 121 for the element acquired immediately prior to (in other words, a second indicator calculated for the element immediately prior to) the element acquired by the acquisition unit 50 for the current time.

Subsequently, the second indicator calculation unit 121 calculates a new second indicator (that is, a second indicator for the element acquired by the acquisition unit 50 for the current time), based on the first indicator calculated by the first calculation unit 110 and the past second indicator read from the second storage unit 122 (step S15). Here in particular, the second indicator calculation unit 121 calculates the new second indicator by performing weighting with a weight calculated by the weight calculation unit 130. The second indicator calculation unit 121 outputs the calculated second indicator to the classification unit 60. The second indicator calculation unit 121 may store the calculated second indicator in the second storage unit 122.

Subsequently, the classification unit 60 determines whether or not the sequential data can be classified as any one of the plurality of classes by using the second indicator calculated by the second calculation unit 120 (step S16). Note that specific content of the process of determination is described in detail in the other embodiments described later. When it is determined that the sequential data cannot be classified as any of the plurality of classes by using the second indicator (step S16: NO), the information processing system 10 according to the first embodiment starts the processes again from step S11. Specifically, the information processing system 10 according to the first embodiment repeats the similar processes for an element of the sequential data following the element acquired for the current time. In contrast, when it is determined that the sequential data can be classified as any one of the plurality of classes by using the second indicator (step S16: YES), the classification unit 60 classifies the sequential data as any one of the plurality of classes based on the second indicator (step S17). In the latter case, the series of processes is terminated.

Technical Effects

Next, technical effects achieved by the information processing system 10 according to the first embodiment are described.

In the information processing system 10 according to the first embodiment, sequential data is classified as any one of a plurality of classes by using a first indicator and a second indicator calculated from each element included in the sequential data. In the first embodiment in particular, the second indicator used in classification is calculated from the first indicator that is weighted with a weight calculated according to a confidence of each element. In other words, influence of each element included in the sequential data on a classification result can be given bias. For example, for an element with a higher confidence, influence of the element on a classification result can be made greater by applying a larger weight to a corresponding first indicator, while for an element with a lower confidence, influence of the element on a classification result can be reduced by applying a smaller weight to a corresponding first indicator. As a result, the sequential data can be classified more appropriately than in cases where weighting is not performed.

The classification process in the information processing system 10 according to the first embodiment is more effective when correlation between elements of sequential data is stronger. If an algorithm is used that does not take correlation between elements of sequential data into consideration, classification is performed on an assumption that there is no correlation between elements, even for sequential data in which elements have strong correlation. In contrast, since the classification process in the information processing system 10 according to the first embodiment takes correlation between elements of sequential data into consideration, classification accuracy can be enhanced for sequential data in which elements have strong correlation.

One of specific examples of sequential data in which elements have strong correlation is time-series data such as video data or audio data. The reason is that for example, in video data, a frame and a following frame generally have similar features in many cases. Accordingly, the classification process in the information processing system 10 according to the first embodiment is further more effective in processing of time-series data. Alternatively, other specific examples of sequential data in which elements have strong correlation include a tree topology, a flowchart, and the like.

Second Embodiment

An information processing system 10 according to a second embodiment is described with reference to FIGS. 4*a*, 4*b* to 6. The second embodiment is to describe specific examples of the confidence described in the first embodiment, and a system configuration and operation may be similar to those of the first embodiment (see FIGS. 1 to 3). Accordingly, in the following, a description of part overlapping with the first embodiment is omitted as appropriate. In the second embodiment, a description is progressed based on the premise that sequential data is acquired as time-series image data.

Confidence Based on Degree of Clarity

First, the confidence based on a degree of clarity of an image is described with reference to FIGS. 4*a*, 4*b*. FIGS. 4*a*, 4*b* are a diagram (version 1) showing examples of image data processed by the information processing system according to the second embodiment.

As shown in FIGS. 4*a*, 4*b*, in the information processing system 10 according to the second embodiment, the confidence of each element included in sequential data may be set based on the degree of clarity of image data. For example, for image data with a high degree of clarity as shown in FIG. 4*a*, a high confidence may be set. On the other hand, for image data with a low degree of clarity as shown in FIG. 4*b*, a low confidence may be set.

More specifically, the confidence may be a value calculated from a parameter indicating a degree of absence of out-of-focus part in a region of interest (a region including an imaging target) and/or a degree of absence of blur of the imaging target, in terms of the degree of clarity of image data. For example, if a calculation formula is prepared that includes a degree of clarity represented by a first parameter indicating a relationship between a depth of field of image data and a position of an imaging target, a second parameter indicating a relationship between a speed of movement of the imaging target and a shutter speed, and/or a third parameter indicating darkness of the imaging target, the weight calculation unit 130 can easily calculate the confidence by substituting values or a value of the first parameter, the second parameter, and/or the third parameter into the degree-of-clarity-based calculation formula. Hereinafter, the first to third parameters are referred to as the "degree-of-clarity indicators", or simply the "degree of clarity", of image data. The degree of clarity of image data may be acquired together with the image data by the acquisition unit 50, or may be acquired by being estimated from the image data. Alternatively, instead of the degree of clarity of image data, the calculation unit 130 may the depth of field of a camera that captures an image and a face Alternatively, the confidence may be set based on whether or not the degree of clarity of image data is equal to or more than a predetermined threshold value. In such a case, the weight calculation unit 130 may set the confidence "high" when the degree of clarity of image data is equal to or more than the predetermined threshold value, and may set the confidence "low" when the degree of clarity of image data is less than the predetermined threshold value. The weight calculation unit 130 may set a plurality of predetermined threshold values related to the degree of clarity. For example, when the degree of clarity of image data is equal to or more than a first threshold value, the weight calculation unit 130 may set the confidence "high"; when the degree of clarity of image data is less than the first threshold value and is equal to or more than a second threshold value, the weight calculation unit 130 may set the confidence "middle"; and when the degree of clarity of image data is less than the second threshold value, the weight calculation unit 130 may set the confidence "low".

When the degree of clarity of image data is low, it is difficult to correctly identify an imaging target appearing in the image. Accordingly, if such image data exerts great influence on classification, there is a possibility that appropriate classification cannot be performed. However, if a configuration is made such that the confidence is set according to a level of the degree of clarity of image data, influence of each image data on classification can be reduced. For example, by performing weighting with a weight according to the confidence, influence of image data with a higher degree of clarity (that is, with a higher confidence) on classification can be made greater. On the other hand, influence of image data with a lower degree of clarity (that is, with a lower confidence) on classification can be made smaller. As described above, if the confidence is set according to the degree of clarity of image data, appropriate weighting is performed, so that sequential data can be appropriately classified.

Confidence Based on Distance to Target

Next, the confidence based on a distance to a target is described with reference to FIGS. 5a, 5b. FIGS. 5a, 5b are a diagram (version 2) showing examples of image data processed by the information processing system according to the second embodiment.

As shown in FIGS. 5a, 5b, in the information processing system 10 according to the second embodiment, the weight calculation unit 130 may set the confidence of each element included in sequential data, based on a degree of closeness of an imaging target in image data (more specifically, a degree of shortness of a distance between a camera capturing the image data and the imaging target). For example, for image data in which the distance to an imaging target (here, a person) is short as shown in FIG. 5a, the weight calculation unit 130 may set a high confidence. On the other hand, for image data in which the distance to an imaging target is less short as shown in FIG. 5b, the weight calculation unit 130 may set a low confidence.

More specifically, the confidence may be a value calculated from a parameter indicating a distance to an imaging target in image data. For example, if a calculation formula is prepared that yields a higher value as the distance to an imaging target is shorter, the weight calculation unit 130 can easily calculate the confidence from the distance to an imaging target. The distance to an imaging target in image data may be acquired together with the image data, or may be acquired by being estimated from the image data. The distance to an imaging target may be calculated, for example, from a size of the imaging target in the image (for example, a proportion of the entire image covered by the imaging target), or the like. Alternatively, the distance to an imaging target may be measured by using a range sensor.

Alternatively, the confidence may be set based on whether or not the distance to an imaging target in image data is less than a predetermined threshold value. In such a case, when the distance to an imaging target is less than the predetermined threshold value, the weight calculation unit 130 may set the confidence "high", and when the distance to an imaging target is equal to or more than the predetermined threshold value, the weight calculation unit 130 may set the confidence "low". The weight calculation unit 130 may set a plurality of predetermined threshold values related to the distance. For example, when the distance to an imaging target is less than a first threshold value, the weight calculation unit 130 may set the confidence "high"; when the distance to an imaging target is equal to or more than the first threshold value and is less than a second threshold value, the weight calculation unit 130 may set the confidence "middle"; and when the distance to an imaging target is equal to or more than the second threshold value, the weight calculation unit 130 may set the confidence "low".

When the distance to an imaging target in image data is long, it is difficult to correctly identify the imaging target appearing in the image. Accordingly, if such image data exerts great influence on classification, there is a possibility that appropriate classification cannot be performed. However, if a configuration is made such that the confidence is set according to the degree of shortness of the distance to an imaging target in image data, influence of each image data on classification can be reduced. For example, by performing weighting with a weight according to the confidence, influence of image data with a shorter distance (that is, with a higher confidence) on classification can be made greater. On the other hand, influence of image data with a longer distance (that is, with a lower confidence) on classification can be made smaller. As described above, if the confidence is set according to the distance to an imaging target in image data, appropriate weighting is performed, so that sequential data can be appropriately classified.

Confidence Based on Acquisition Timing

Figure 6:
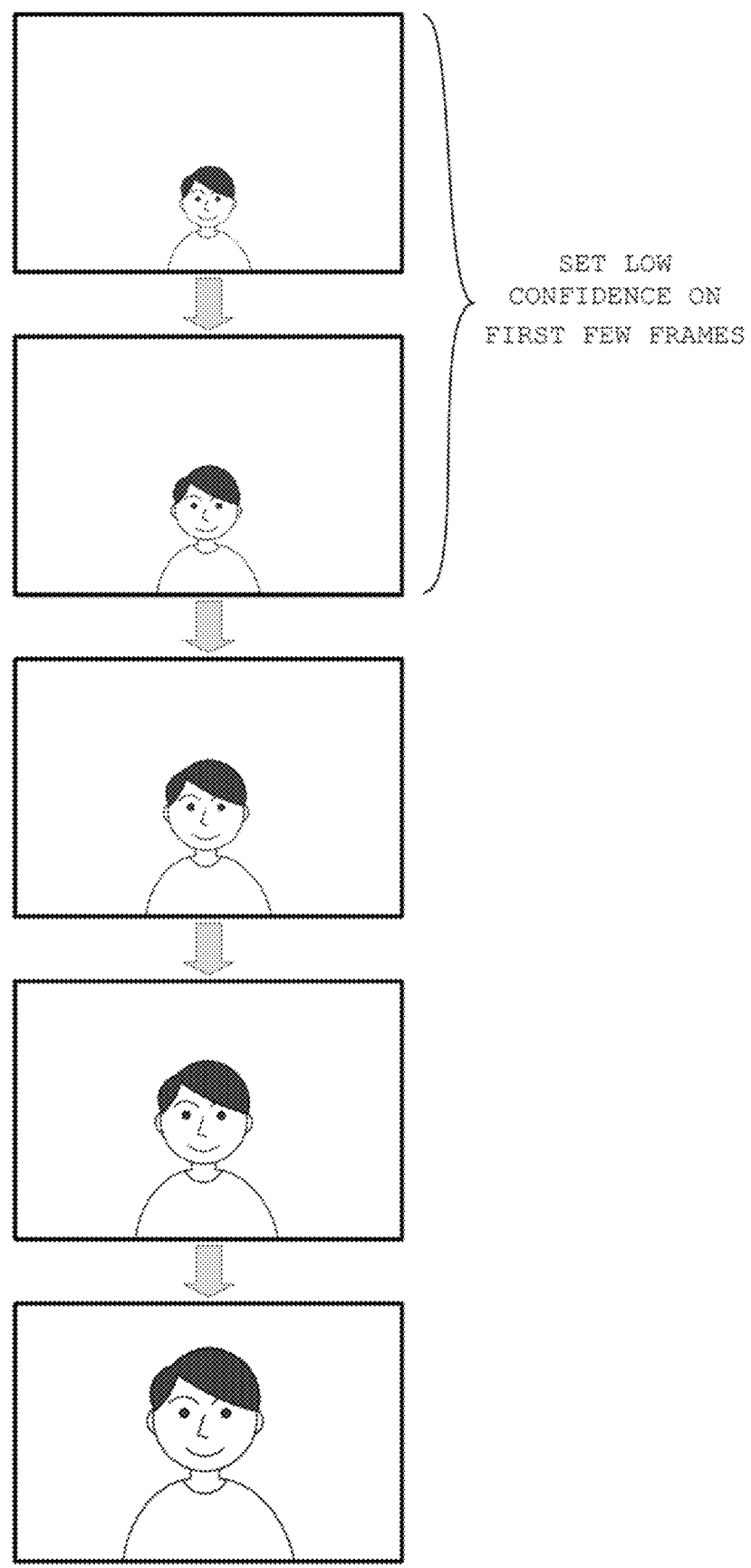
FIG. 6 is a diagram (version 3) showing an example of image data processed by the information processing system according to the second embodiment.

Next, the confidence based on a timing of acquiring an image is described with reference to FIG. 6. FIG. 6 is a diagram (version 3) showing an example of image data processed by the information processing system according to the second embodiment.

As shown in FIG. 6, in the information processing system 10 according to the second embodiment, the confidence of each element included in sequential data may be set based on a timing of acquiring image data. For example, in the example shown in FIG. 6, time-series image data is acquired in which a person that is an imaging target gradually comes closer to a camera. In such a case, in image data of a first few frames, it is difficult to correctly identify the imaging target because the imaging target in the image is small. Accordingly, for the image data of the first few frames, a low confidence may be set. On the other hand, for image data of the following frames, a high confidence may be set. Here, a criterion to determine a beginning frame is not limited. For example, in the time-series image data, the beginning frame may be a frame in which a face of the person is detected for the first time, or may be a frame in which the person is detected for the first time by a human detection sensor.

More specifically, the confidence may be a value calculated from a parameter indicating where image data of interest is positioned in term of order of acquisition. For example, if a calculation formula is prepared that yields a lower value as the acquisition timing is earlier, the weight calculation unit 130 can easily calculate the confidence from the timing of acquiring image data. For example, the parameter indicating the timing of acquiring image data may be the number of frames before the image data as in the example shown in FIG. 6, or may be a parameter indicating a clock time at which the image data is acquired. Moreover, the acquisition timing here may correspond to a timing when image data is captured, or may correspond to a timing when image data is acquired by the acquisition unit 50.

Alternatively, the confidence may be set based on whether or not the timing of acquiring image data is equal to or more than a predetermined threshold value. In such a case, when the timing of acquiring image data is equal to or more than the predetermined threshold value, the weight calculation unit 130 may set the confidence "high", and when the timing of acquiring image data is less than the predetermined threshold value, the weight calculation unit 130 may set the confidence "low". A plurality of predetermined threshold values related to acquisition timing may be set. For example, when the timing of acquiring image data is equal to or more than a first threshold value, the weight calculation unit 130 may set the confidence "high"; when the timing of acquiring image data is less than the first threshold value and is equal to or more than a second threshold value, the weight calculation unit 130 may set the confidence "middle"; and when the timing of acquiring image data is less than the second threshold value, the weight calculation unit 130 may set the confidence "low".

In some cases, quality and nature of image data (for example, a way in which an imaging target appears, or the like) greatly change with different acquisition timings. In such a case, if a configuration is made such that the confidence is set according to the timing of acquiring image data, influence of each image data on classification can be reduced. For example, by performing weighting with a weight according to the confidence, influence of image data acquired at a later timing (that is, with a higher confidence) on classification can be made greater. On the other hand, influence of image data acquired at an earlier timing (that is, with a lower confidence) on classification can be made smaller. Note that conversely to the example described above, a lower confidence may be set on image data acquired at a later timing, and a higher confidence may be set on image data acquired at an earlier timing. The latter example can be applied to a case where time-series image data is acquired in which an imaging target goes farther away from a camera, or the like. As described above, if the confidence is set according to different acquisition timings, appropriate weighting is performed, so that sequential data can be appropriately classified.

Third Embodiment

An information processing system 10 according to a third embodiment is described with reference to FIGS. 7a, 7b and FIGS. 8a, 8b. The third embodiment is to describe specific examples of the confidence as in the second embodiment, and a system configuration and operation may be similar to those of the first embodiment (see FIGS. 1 to 3). Accordingly, in the following, a description of part overlapping with the first embodiment is omitted as appropriate.

Confidence Based on Difference Between First Indicators

Figure 7:
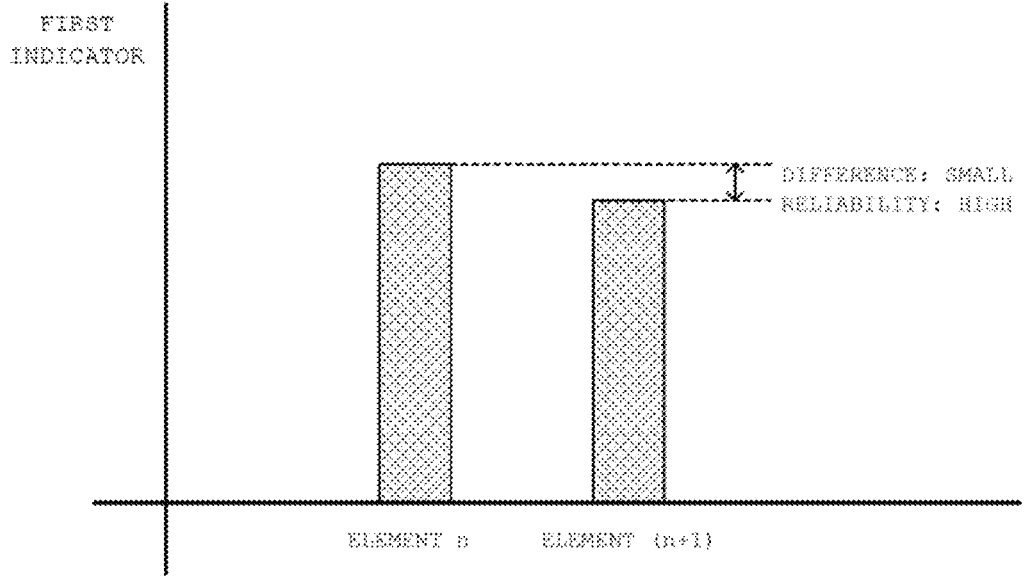
FIG. 7 shows examples of a difference between first indicators calculated by an information processing system according to a third embodiment.
Figure 7:
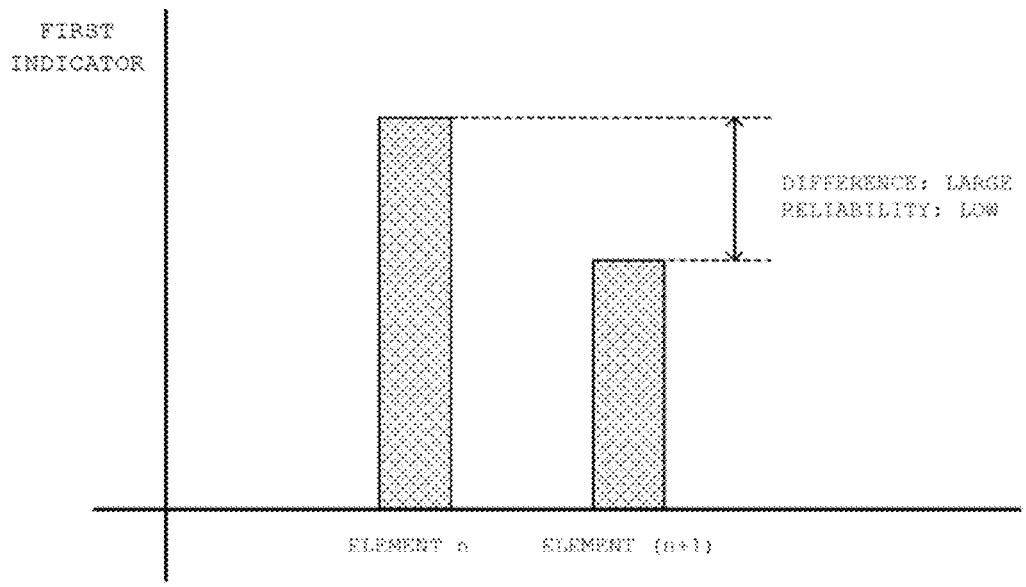

First, the confidence based on a difference between first indicators is described with reference to FIGS. 7a, 7b. FIGS. 7a, 7b show examples of the difference between first indicators calculated by the information processing system according to the third embodiment.

As shown in FIGS. 7a, 7b, in the information processing system 10 according to the third embodiment, the confidence of each acquired element is set based on the difference between first indicators calculated by the first calculation unit 110. Specifically, the confidence of an n-th acquired element n and/or the confidence of an (n+1)-th acquired element (n+1) is set, based on the difference between a first indicator calculated for the n-th acquired element n and a first indicator calculated for the (n+1)-th acquired element (n+1). The difference between first indicators is calculated as the difference between first indicators for two consecutively acquired elements as described above.

The confidence of each element included in sequential data is set such that the smaller the difference between first indicators is, the higher confidence the element has. For example, when the difference between the first indicator calculated for the element n and the first indicator calculated for the element (n+1) is small as shown in FIG. 7a, a high confidence may be set. When the difference between the first indicator calculated for the element n and the first indicator calculated for the element (n+1) is large as shown in FIG. 7b, a low confidence may be set.

More specifically, the confidence may be a value calculated from a value of the difference between first indicators. For example, if a calculation formula is prepared that yields a higher value as the difference between first indicators is smaller, the confidence can be easily calculated from the difference between first indicators.

Alternatively, the confidence may be set based on whether or not the difference between first indicators is less than a predetermined threshold value. In such a case, when the difference between first indicators is less than the predetermined threshold value, the weight calculation unit 130 may set the confidence "high", and when the difference between first indicators is equal to or more than the predetermined threshold value, the weight calculation unit 130 may set the confidence "low". The weight calculation unit 130 may set a plurality of predetermined threshold values related to the difference between first indicators. For example, when the difference between first indicators is less than a first threshold value, the weight calculation unit 130 may set the confidence "high"; when the difference between first indicators is equal to or more than the first threshold value and is less than a second threshold value, the weight calculation unit 130 may set the confidence "middle"; and when the difference between first indicators is equal to or more than the second threshold value, the weight calculation unit 130 may set the confidence "low".

When the difference between first indicators is large, it is conceivable that a great difference occurs between two consecutive elements. In such a case, it is likely that one of the two elements is an element unsuitable for use in calculation of the first indicator. However, if a configuration is made such that the confidence is set according to the difference between first indicators, influence of each element on classification can be reduced. For example, by performing weighting with a weight according to the confidence, influence of an element with a smaller first-indicator difference on classification can be made greater. On the other hand, influence of an element with a larger first-indicator difference on classification can be made smaller. As described above, if the confidence is set according to the difference between first indicators, appropriate weighting is performed, so that sequential data can be appropriately classified.

Confidence Based on Volatility of First Indicator

Figure 8:
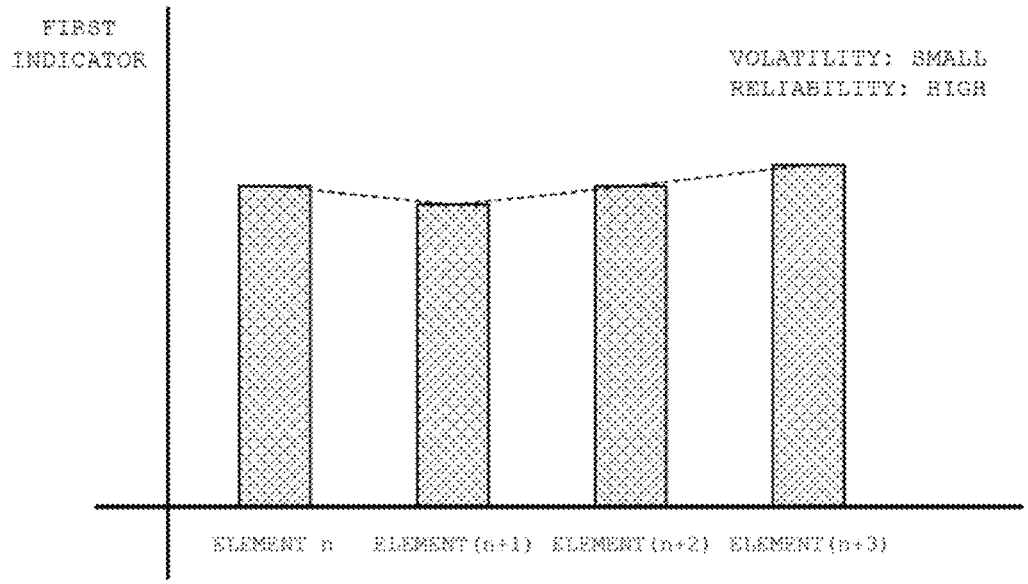
FIG. 8 shows examples of volatility of the first indicator calculated by the information processing system according to the third embodiment.
Figure 8:
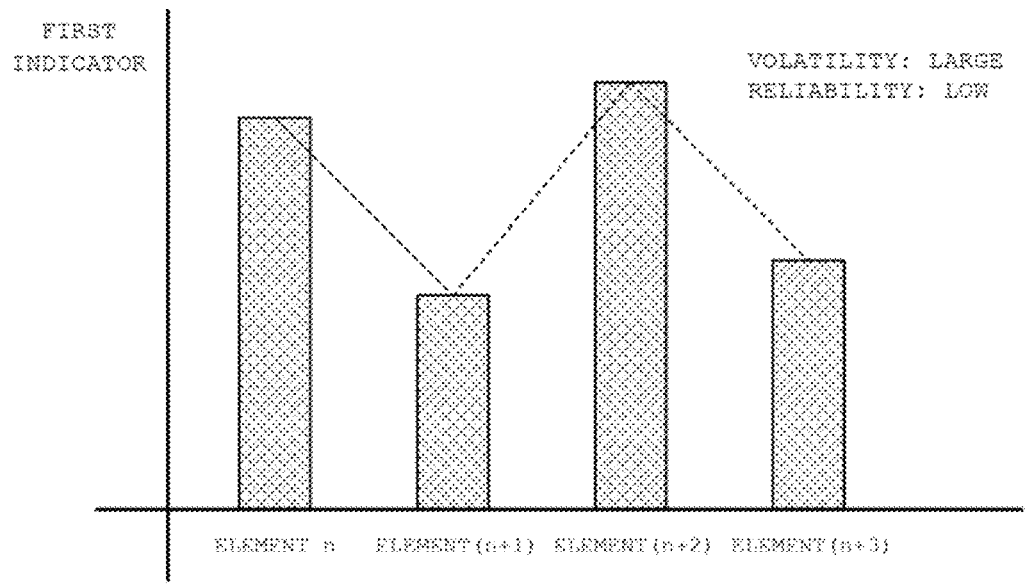

Next, the confidence based on volatility of the first indicator is described with reference to FIGS. 8a, 8b. FIGS. 8a, 8b show examples of the volatility of the first indicator calculated by the information processing system according to the third embodiment.

As shown in FIGS. 8a, 8b, in the information processing system 10 according to the third embodiment, the confidence of each acquired element is set based on the volatility of the first indicator calculated by the first calculation unit 110. Specifically, at least one of the degrees of reliability of an n-th acquired element n, an (n+1)-th acquired element (n+1), an (n+2)-th acquired element (n+2), and an (n+3)-th acquired element (n+3) is set based on a size of fluctuations among a first indicator calculated for the n-th acquired element n, a first indicator calculated for the (n+1)-th acquired element (n+1), a first indicator calculated for the (n+2)-th acquired element (n+2), and a first indicator calculated for the (n+3)-th acquired element (n+3).

The confidence of each element included in sequential data is set such that the smaller the volatility of the first indicator is, the higher confidence the element has. For example, when the volatility among the first indicators calculated for the elements n, (n+1), (n+2), and (n+3) is small as shown in FIG. 8a, a high confidence may be set. When the volatility among the first indicators calculated for the elements n, (n+1), (n+2), and (n+3) is large as shown in FIG. 8b, a low confidence may be set.

More specifically, the confidence may be a value calculated from a value indicating the volatility of the first indicator. For example, if a calculation formula is prepared that yields a higher value as the volatility of the first indicator is smaller, the confidence can be easily calculated from the volatility of the first indicator. Note that since the value indicating the volatility of the first indicator can be calculated by adopting an existing scheme as appropriate, a specific description here is omitted.

Alternatively, the confidence may be set based on whether or not the volatility of the first indicator is less than a predetermined threshold value. In such a case, when the volatility of the first indicator is less than the predetermined threshold value, the weight calculation unit 130 may set the confidence "high", and when the volatility of the first indicator is equal to or more than the predetermined threshold value, the weight calculation unit 130 may set the confidence "low". The weight calculation unit 130 may set a plurality of predetermined threshold values related to the volatility of the first indicator. For example, when the volatility of the first indicator is less than a first threshold value, the weight calculation unit 130 may set the confidence "high"; when the volatility of the first indicator is equal to or more than the first threshold value and is less than a second threshold value, the weight calculation unit 130 may set the confidence "middle"; and when the volatility of the first indicator is equal to or more than the second threshold value, the weight calculation unit 130 may set the confidence "low".

When the volatility of the first indicator is large, it is conceivable that a great difference occurs between each element. In such a case, it is likely that at least one of such a plurality of elements is an element unsuitable for use in calculation of the first indicator. However, if a configuration is made such that the confidence is set according to the volatility of the first indicator, influence of each element on classification can be reduced. For example, by performing weighting with a weight according to the confidence, influence of an element with smaller first-indicator volatility on classification can be made greater. On the other hand, influence of an element with larger first-indicator volatility on classification can be made smaller. As described above, if the confidence is set according to the volatility of the first indicator, appropriate weighting is performed, so that sequential data can be appropriately classified.

Fourth Embodiment

An information processing system 20 according to a fourth embodiment is described with reference to FIG. 9. Note that the fourth embodiment is different from the above-described first to third embodiments in part of the configuration, and a hardware configuration, as well as operation of the system as a whole as described above, may be similar to those of the first embodiment (see FIGS. 1 and 3). Accordingly, in the following, the part different from the above-described first to third embodiments is described in detail, and a description of other overlapping part is omitted as appropriate.

Functional Configuration

First, a functional configuration of the information processing system 20 according to the fourth embodiment is described with reference to FIG. 9. FIG. 9 is a block diagram showing the function configuration of the information processing system according to the fourth embodiment. Note that in FIG. 9, elements similar to the constitutional elements shown in FIG. 2 are denoted by the same reference numbers as in FIG. 2.

Figure 9:
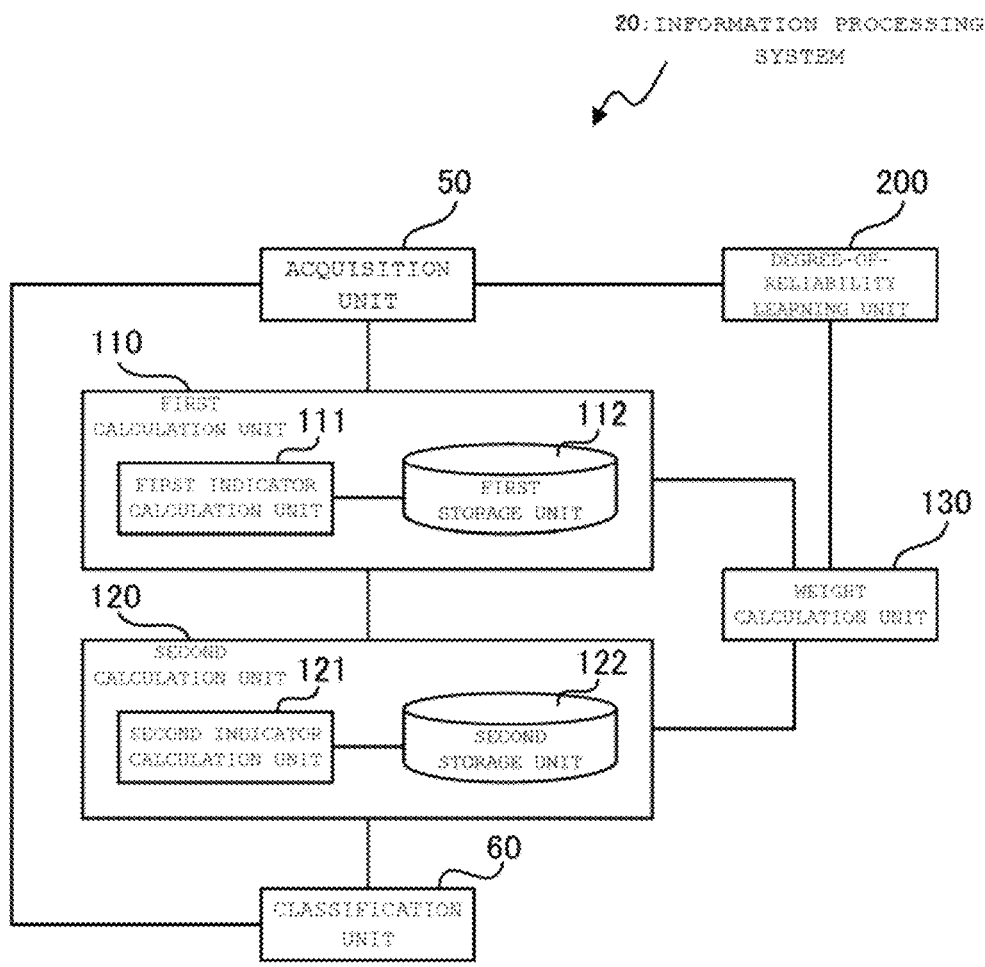
FIG. 9 is a block diagram showing a functional configuration of an information processing system according to a fourth embodiment.

As shown in FIG. 9, the information processing system 20 according to the fourth embodiment includes, as processing blocks for implementing functions of the information processing system 20, an acquisition unit 50, a first calculation unit 110, a second calculation unit 120, a weight calculation unit 130, a classification unit 60, and a degree-of-reliability learning unit 200. In other words, the information processing system 20 according to the fourth embodiment further includes the degree-of-reliability learning unit 200, in addition to the components in the first embodiment (see FIG. 2). Note that the degree-of-reliability learning unit 200 may be implemented by the above-described processor 11 (see FIG. 1).

The degree-of-reliability learning unit 200 is configured to be able to execute machine learning related to the confidence of each element included in sequential data. For example, the degree-of-reliability learning unit 200 includes a neural network and optimizes, through learning, a model that determines the confidence of each element included in sequential data. The degree-of-reliability learning unit 200 executes machine learning by using, for training data, for example, pairs of an element and a confidence of the element. The degree-of-reliability learning unit 200 determines the confidence of each element acquired by the acquisition unit 50, by using a result of the machine learning. For example, the degree-of-reliability learning unit 200 acquires information on an acquired element from the acquisition unit 50, and determines the confidence of the element by using the learning result. The confidence determined by the degree-of-reliability learning unit 200 is outputted to, for example, the weight calculation unit 130 and is used to calculate a weight. Alternatively, the confidence determined by the degree-of-reliability learning unit 200 may be stored in the first storage unit 112 or the like in association with the element acquired by the acquisition unit 50. Alternatively, the degree-of-reliability learning unit 200 can also use a confidence between elements included in the sequential data, instead of the confidence of an element alone. In such a case, the confidence between elements may represent a degree of a probability that the elements are consecutive.

Technical Effects

Next, technical effects achieved by the information processing system 20 according to the fourth embodiment are described.

In the information processing system 20 according to the fourth embodiment, the confidence of each element included in sequential data is determined by the degree-of-reliability learning unit 200. Accordingly, the confidence of each element included in sequential data can be easily determined, and consequently, an appropriate weight can be calculated.

Fifth Embodiment

An information processing system 10 according to a fifth embodiment is described with reference to FIGS. 10 to 12. The fifth embodiment is different from the above-described first to fourth embodiments in part of the configuration and operation, and, for example, a hardware configuration may be similar to that of the first embodiment (see FIG. 1). Accordingly, in the following, the part different from the above-described first to fourth embodiments is described in detail, and a description of other overlapping part is omitted as appropriate.

Functional Configuration

First, a functional configuration of the information processing system 10 according to the fifth embodiment is described with reference to FIG. 10. FIG. 10 is a block diagram showing the functional configuration of the information processing system according to the fifth embodiment. Note that in FIG. 10, elements similar to the constitutional elements shown in FIG. 2 are denoted by the same reference numbers as in FIG. 2.

Figure 10:
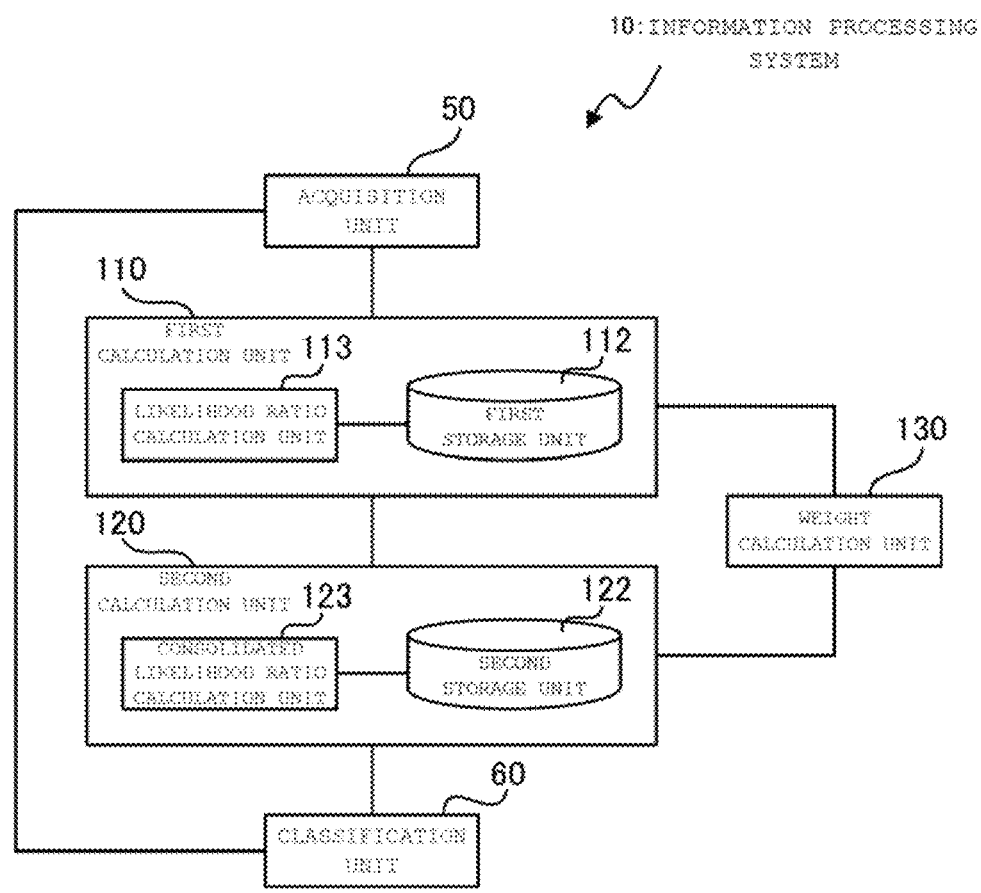
FIG. 10 is a block diagram showing a functional configuration of an information processing system according to a fifth embodiment.

As shown in FIG. 10, the information processing system 10 according to the fifth embodiment includes, as processing blocks for implementing functions of the information processing system 10, an acquisition unit 50, a first calculation unit 110, a second calculation unit 120, a weight calculation unit 130, and a classification unit 60. The information processing system 10 according to the fifth embodiment includes a likelihood ratio calculation unit 113 and a consolidated likelihood ratio calculation unit 123, in place of the first indicator calculation unit 111 and the second indicator calculation unit 121 in the first embodiment, respectively. Note that each of the likelihood ratio calculation unit 113 and the consolidated likelihood ratio calculation unit 123 may be implemented by the above-described processor 11 (see FIG. 1).

The likelihood ratio calculation unit 113 is configured to be able to calculate a likelihood ratio as the first indicator. The likelihood ratio calculation unit 113 calculates the likelihood ratio, based on an acquired element and past data. The likelihood ratio is a value indicating a likelihood that each of a plurality of elements belongs to a class of a plurality of classes. In the following, a specific example of the likelihood ratio is described.

It is assumed that N elements included in sequential data are $x_1, \ldots, x_N$, and that a plurality of classes are R, F. In other words, for simplicity, 2-class classification, in which the number of classes is two, is assumed in the present example. Here, a result of calculating a probability that an element $x_i$ belongs to the class R, without taking past data into consideration, is represented by $p(R|x_i)$. Moreover, a result of calculating a probability that the element $x_i$ belongs to the class F, without taking past data into consideration, is represented by $p(F|x_i)$. At the time, a likelihood ratio between the probabilities is expressed as in a following expression (1).

[Expression 1]

$$\frac{p(R|x_i)}{p(F|x_i)} \quad (1)$$

The likelihood ratio in the expression (1) indicates a ratio between likelihoods that are the probability that the element $x_i$ belongs to the class R and the probability that the element $x_i$ belongs to the class F. For example, when the likelihood ratio exceeds one, the element $x_i$ may be classified as the class R, rather than the class F, because $p(R|x_i)>p(F|x_i)$. As described above, the likelihood ratio in the expression (1) functions as an indicator indicating which one of the class R and the class F an inputted element belongs to.

The likelihood ratio calculation unit 113 can perform calculation by taking a plurality of elements (that is, relevance between an inputted element and past data) into consideration as described above. In such a case, for example, a likelihood ratio calculated by taking two elements $x_i$, $x_{i-1}$ into consideration is expressed as in a following expression (2).

[Expression 2]

$$\frac{p(R|x_i, x_{i-1})}{p(F|x_i, x_{i-1})} \quad (2)$$

The consolidated likelihood ratio calculation unit 123 is configured to be able to calculate a consolidated likelihood ratio as the second indicator. The consolidated likelihood ratio calculation unit 123 calculates the consolidated likelihood ratio by using a likelihood ratio calculated by the likelihood ratio calculation unit 113 and a past consolidated likelihood ratio. The consolidated likelihood ratio is a value indicating a likelihood that sequential data belongs to a class of a plurality of classes. In the following, a specific example of the consolidated likelihood ratio is described. Note that a case of 2-class classification, in which the number of classes is two, is described, similarly to the description of the likelihood ratio given above.

When N elements are inputted at a point of time of calculating a consolidated likelihood ratio, the N elements are denoted by $x_1, \ldots, x_N$. Here, a probability that the entire sequential data belongs to the class R is represented by $p(x_1, \ldots, x_N|R)$. Moreover, a probability that the entire sequential data belongs to the class F is represented by $p(x_1, \ldots, x_N|F)$. In such a case, a likelihood ratio between the probabilities is expressed by a following expression (3). The expression (3) is referred to as a consolidated likelihood ratio.

[Expression 3]

$$\frac{p(x_1, \ldots, x_N|R)}{p(x_1, \ldots, x_N|F)} \quad (3)$$

When it is assumed that each element of the sequential data is independent of each other, the consolidated likelihood ratio can be calculated by being broken down into terms for the individual elements as in a following expression (4).

[Expression 4]

$$\log\left[\frac{p(x_1, \ldots, x_N|R)}{p(x_1, \ldots, x_N|F)}\right] = \sum_{i=1}^{N} \log\left[\frac{p(R|x_i)}{p(F|x_i)}\right] \quad (4)$$

In the expression (4), although a logarithm of the likelihood ratio is used for breaking-down into a sum of the terms for the individual elements to simplify the calculation, such formulation is not essential. Note that in the following, the term "likelihood ratio" or "consolidated likelihood ratio" is also used for such a logarithmic likelihood ratio in some cases. Moreover, although presentation of a base of the logarithm is omitted, the base may take an arbitrary value.

However, the assumption that each element is independent of each other does not hold true in many cases because, as described above, the likelihood ratio and the consolidated likelihood ratio are calculated by taking two or more elements into consideration in the present embodiment. Accordingly, breaking-down into terms for each individual elements as in the expression (4) is impossible, and the consolidated likelihood ratio is calculated by using different calculation expressions, depending on the number of elements between which relevance is taken into consideration.

For example, when two elements, namely, an element and an immediately preceding element, are taken into consideration, the consolidated likelihood ratio can be calculated by using a following expression (5).

[Expression 5]

$$\log\left[\frac{p(x_1, \ldots, x_N|R)}{p(x_1, \ldots, x_N|F)}\right] = \sum_{i=2}^{N} \log\left[\frac{p(R|x_i, x_{i-1})}{p(F|x_i, x_{i-1})}\right] - \sum_{i=2}^{N-1} \log\left[\frac{p(R|x_i)}{p(F|x_i)}\right] \quad (5)$$

Moreover, the consolidated likelihood ratio calculation unit 123 according to the present embodiment calculates the consolidated likelihood ratio by performing weighting with a weight according to the confidence of each element. Here, assuming that weights are denoted by $\delta_i^1$ and $\delta_i^2$, the consolidated likelihood ratio on the right side of the expression (5) can be expressed as in an expression (6).

[Expression 6]

$$\sum_{i=2}^{N} \delta_i^1 \cdot \log\left[\left[\frac{p(R|x_i, x_{i-1})}{p(F|x_i, x_{i-1})}\right]\right] - \sum_{i=2}^{N-1} \delta_i^1 \cdot \log\left[\frac{p(R|x_i)}{p(F|x_i)}\right] \quad (6)$$

Although the expression (6) shows an example in a case of 2-class classification in which a likelihood ratio between the classes R and F is calculated, the number of classes may be three or more. For example, when the number of classes is M, an extended expression (6) can be used that is extended such that consolidated likelihood ratios between a k-th class and all the other classes than the k-th class of the M classes can be calculated. One of examples of such extension is an expression using a maximum likelihood among likelihoods for all the other classes than the k-th class, like a following expression (7).

[Expression 7]

$$\sum_{i=2}^{N} \delta_i^1 \cdot \log\left[\frac{p(x_i, x_{i-1}|C_k)}{\max_{j \neq k}[p(x_i, x_{i-1}|C_j)]}\right] - \sum_{i=2}^{N-1} \delta_i^1 \cdot \log\left[\frac{p(x_i|C_k)}{\max_{j \neq k}[p(x_i|C_j)]}\right] \quad (7)$$

Another example is an expression using a sum of likelihoods for all the other classes than the k-th class, like a following expression (8).

[Expression 8]

$$\sum_{i=2}^{S} \delta_i^2 \cdot \log\left[\frac{p(x_i, x_{i-1}|C_k)}{\sum_{j \neq k}^{M} p(x_i, x_{i-1}|C_j)}\right] - \sum_{i=2}^{N-1} \delta_i^2 \cdot \log\left[\frac{p(x_i|C_k)}{\sum_{j \neq k}^{M} p(x_i|C_j)}\right] \quad (8)$$

Note that a method of calculating the consolidated likelihood ratio in a case where the number of classes is three or more is not limited to those described above. Moreover, although the cases where two elements are taken into consideration are illustrated in the expressions (6) to (8), three or more elements may be taken into consideration.

Flow of Operation

Next, a flow of operation of the information processing system 10 according to the fifth embodiment is described with reference to FIG. 11. FIG. 11 is a flowchart showing the flow of the operation of the information processing system according to the fifth embodiment.

Figure 11:
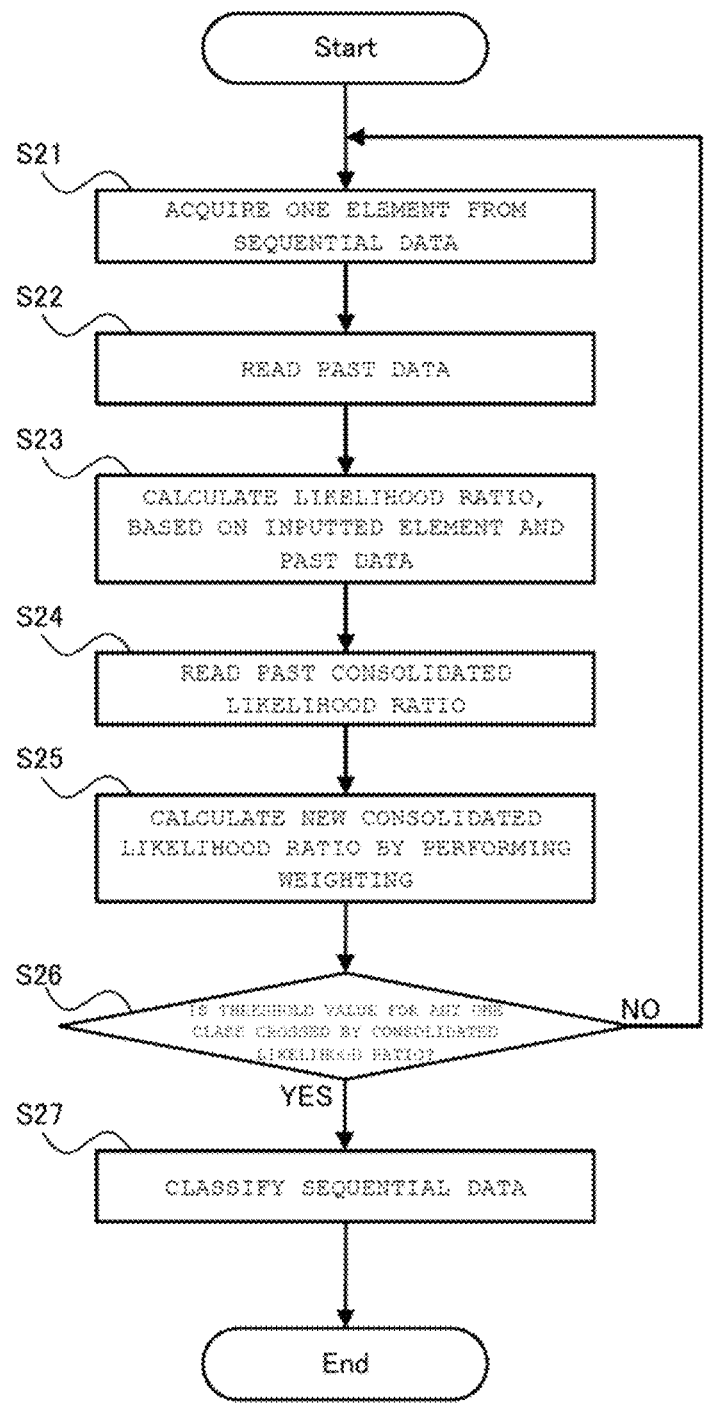
FIG. 11 is a flowchart showing a flow of operation of the information processing system according to the fifth embodiment.

As shown in FIG. 11, in the information processing system 10 according to the fifth embodiment, the acquisition unit 50 acquires one element from sequential data (step S21). The acquisition unit 50 outputs the acquired element of the sequential data to the first calculation unit 110.

Subsequently, the likelihood ratio calculation unit 113 in the first calculation unit 110 reads past data from the first storage unit 112 (step S22). For example, the past data may be a result of the process executed by the likelihood ratio calculation unit 113 for an element acquired immediately prior to (in other words, a likelihood ratio calculated for an element immediately prior to) the element acquired by the acquisition unit 50 for a current time. Alternatively, the past data may be the element itself acquired immediately prior to the element acquired by acquisition unit 50 for a current time.

Subsequently, the likelihood ratio calculation unit 113 calculates a new likelihood ratio (that is, a likelihood ratio for the element acquired by the acquisition unit 50 for the current time), based on the element acquired by the acquisition unit 50 and the past data read from the first storage unit 112 (step S23). The likelihood ratio calculation unit 113 outputs the calculated likelihood ratio to the second calculation unit 120. The likelihood ratio calculation unit 113 may store the calculated likelihood ratio in the first storage unit 112.

Subsequently, the consolidated likelihood ratio calculation unit 123 in the second calculation unit 120 reads a past consolidated likelihood ratio from the second storage unit 122 (step S24). For example, the past consolidated likelihood ratio may be a result of the process executed by the consolidated likelihood ratio calculation unit 123 for the element acquired immediately prior to (in other words, a consolidated likelihood ratio calculated for the element immediately prior to) the element acquired by the acquisition unit 50 for the current time.

Subsequently, the consolidated likelihood ratio calculation unit 123 calculates a new consolidated likelihood ratio (that is, a consolidated likelihood ratio for the element acquired by the acquisition unit 50 for the current time), based on the likelihood ratio calculated by the likelihood ratio calculation unit 113 and the past consolidated likelihood ratio read from the second storage unit 122 (step S25). Here in particular, the consolidated likelihood ratio calculation unit 123 calculates the new consolidated likelihood ratio by performing weighting with a weight calculated by the weight calculation unit 130 (see the above-described expression (6) and the like). The consolidated likelihood ratio calculation unit 123 outputs the calculated consolidated likelihood ratio to the classification unit 60. The consolidated likelihood ratio calculation unit 123 may store the calculated consolidated likelihood ratio in the second storage unit 122.

Subsequently, the classification unit 60 determines whether or not a threshold value for any one class is crossed by the consolidated likelihood ratio calculated by the consolidated likelihood ratio calculation unit 123 (step S26). The threshold value here is preset as a threshold value for determining which one of the plurality of classes the sequential data belongs to. Accordingly, a threshold value is set with respect to each of the plurality of classes. In the following, a description is further progressed by giving a specific example.

The classification process by the classification unit 60 is assumed to be 2-class classification into the class R or the class F, and the threshold values used for determination of the classes R and F are denoted by $T_1$, $T_2$, respectively. Moreover, the consolidated likelihood ratio is denoted by L. In such a case, when $L<T_1$ (step S26: YES), the classification unit 60 classifies the sequential data as the class R (step S27). When $L>T_2$ (step S26: YES), the classification unit 60 classifies the sequential data as the class F (step S27). With the configuration thus made, it can be appropriately determined which class the sequential data belongs to, by comparing the consolidated likelihood ratio with the threshold value of each class. When $T_1 \leq L$ and $L \leq T_2$ (step S26: NO), the classification unit 60 determines that the sequential data cannot be classified, and the acquisition unit 50 acquires a next element. With the configuration thus made, since the consolidated likelihood ratio can be calculated by taking a further acquired element into consideration, the process can be continued, while updating the consolidated likelihood ratio, until the consolidated likelihood ratio crosses the threshold value of any one class (that is, until the sequential data can be classified as any one class).

Note that in a case of classification into M types of classes, M threshold values may be prepared, and the classification process can be performed by comparing each of M consolidated likelihood ratios with each of the M threshold values. At the time, the classification unit 60 may classify the sequential data as a class, the threshold value for which is first crossed by the consolidated likelihood ratio. When the consolidated likelihood ratio does not cross any threshold value, the classification unit 60 determines that the sequential data cannot be classified, and the acquisition unit 50 acquires a next element.

The above-described classification schemes are given for illustrative purposes, and schemes are not limited thereto. For example, a procedure may be modified such that when the number of inputted elements is larger than a predetermined value (a maximum number of elements), sequential data is forcefully classified as any one class and then the processes are terminated even if the threshold value of any class is not crossed by the consolidated likelihood ratio. Thus, a situation can be prevented in which the calculation takes a too long time. In the present example, it is preferable to make determination criteria mutually exclusive so that the sequential data is assuredly classified as any one of the classes.

Specific Example of Classification

Next, a specific example of classification by the information processing system 10 according to the fifth embodiment is described with reference to FIG. 12. FIG. 12 is a graph showing the example of classification by the information processing system according to the fifth embodiment.

Figure 12:
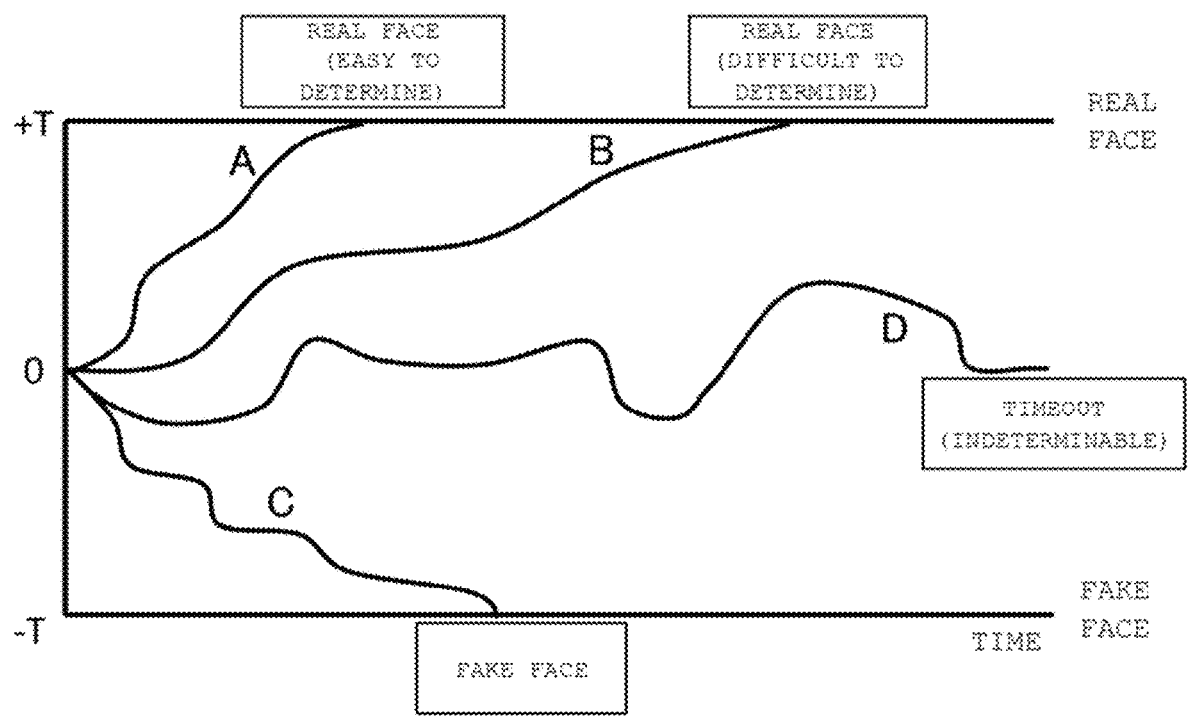
FIG. 12 is a graph showing an example of classification by the information processing system according to the fifth embodiment.

It is assumed that the information processing system 10 according to the fifth embodiment is for classification into a real face and a fake face, as shown in FIG. 12. In other words, the information processing system 10 according to the fifth embodiment is to classify face information inputted as sequential data, as a real-face class or a fake-face class.

First, consolidated likelihood ratios indicated by a line A reach a threshold value+T corresponding to real face relatively early on. Accordingly, it can be determined that sequential data corresponding to the line A is on a real face that is easy to determine. Consolidated likelihood ratios indicated by a line B reach the threshold value+T corresponding to real face in a little later stage than the consolidated likelihood ratios indicated by the line A. Accordingly, it can be determined that sequential data corresponding to the line B is on a real face that is difficult to determine. On the other hand, consolidated likelihood ratios indicated by a line C ultimately reach a threshold value -T corresponding to fake face. Accordingly, it can be determined that sequential data corresponding to the line C is on a fake face. Note that consolidated likelihood ratios indicated by a line D result in a timeout, without reaching any of the threshold value +T corresponding to real face and the threshold value -T corresponding to fake face (that is, a predetermined time period has passed since the processes were started). For such sequential data, the processes may be terminated without the sequential data being classified as any of the classes. In such a case, the information processing system 10 according to the fifth embodiment may output information indicating that the sequential data is indeterminable.

Note that the threshold values +T and -T may be different values. In other words, "+T" and "-T" may be set as values, absolute values of which are different from each other. For example, if the threshold value +T is set larger than the threshold value -T, it can be made easier to determine that sequential data is on a real face and, on the other hand, it can be made more difficult to determine that sequential data is on a fake face. Conversely, if the threshold value +T is set smaller than the threshold value -T, it can be made more difficult to determine that sequential data is on a real face and, on the other hand, it can be made easier to determine that sequential data is on a fake face.

Technical Effects

Next, technical effects achieved by the information processing system 10 according to the fifth embodiment are described.

In the information processing system 10 according to the fifth embodiment, a likelihood ratio and a consolidated likelihood ratio are calculated from each element included in sequential data, and the sequential data is classified as any one of a plurality of classes. As described already, the likelihood ratio is a value indicating a likelihood that each of the plurality of elements belongs to a class of the plurality of classes. Accordingly, if the likelihood ratio is used for the first indicator, the second indicator (that is, the consolidated likelihood ratio) can be appropriately calculated. The consolidated likelihood ratio is a value indicating a likelihood that the sequential data belongs to a class of the plurality of classes. Accordingly, if the consolidated likelihood ratio is used for the second indicator, the sequential data can be appropriately classified into the plurality of classes.

Note that when the consolidated likelihood ratio is used, inclusion of inappropriate partial data can cause unexpected failure. Specifically, since all elements in a sequence are taken into consideration, the inappropriate partial data is also taken into consideration, and consequently problems may occur, such as deterioration in classification accuracy and delayed classification time. However, in the present embodiment, the consolidated likelihood ratio is calculated in a state where a weight is applied with respect to each element. Accordingly, occurrence of failure as described above can be effectively restrained.

Sixth Embodiment

An individual identification system according to a sixth embodiment is described with reference to FIG. 13. Note that the sixth embodiment is to describe an example of application of the information processing system according to any of the above-described first to fifth embodiments, and, for example, a hardware configuration may be similar to that of the first embodiment (see FIG. 1). Accordingly, in the following, part different from the first to fifth embodiments is described in detail, and a description of other overlapping part is omitted as appropriate.

Functional Configuration

First, a functional configuration of the individual identification system 300 according to the sixth embodiment is described with reference to FIG. 13. FIG. 13 is a block diagram showing the functional configuration of the individual identification system according to the sixth embodiment.

Figure 13:
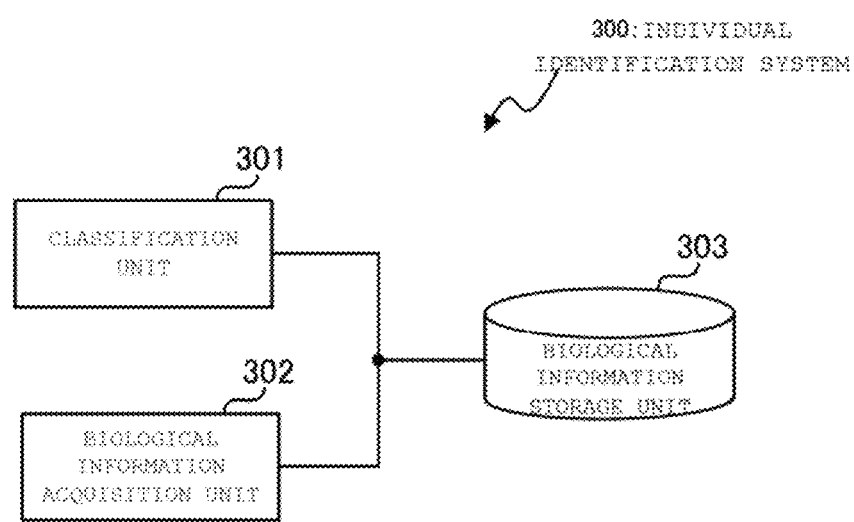
FIG. 13 is a block diagram showing a functional configuration of an individual identification system according to a sixth embodiment.

In FIG. 13, the individual identification system 300 according to the sixth embodiment is configured as a system that identifies an individual, for example, by matching biological information on an identification target, such as a face image, a fingerprint image, or an iris image, against preregistered biological information. The individual identification system 300 may include a device for acquiring biological information (for example, a camera or the like) and operate on a stand-alone basis, or may identify an individual by acquiring biological information from another device in the individual identification system. The individual identification system 300 may be configured with a plurality of devices that are communicationally connected to each other.

For example, the individual identification system 300 may be configured as an authentication apparatus for a face recognition gate. Alternatively, the individual identification system 300 may be configured as an intelligent camera. The intelligent camera here is an IP (Internet Protocol) camera or a network camera that internally includes an analysis function, and is also referred to as a smart camera in some cases.

The individual identification system 300 according to the sixth embodiment includes, as processing blocks for implementing functions of the individual identification system 300, a classification unit 301, a biological information acquisition unit 302, and a biological information storage unit 303.

The classification unit 301 includes the information processing system 10 according to any one of the embodiments described above. For the classification device 301, the information processing system 10 according to the first embodiment is used. The classification unit 310 acquires sequential data including biological information as elements. The classification unit 301 classifies the inputted sequential data as any one of a plurality of predetermined classes, while referring to information stored in the biological information storage unit 303. The plurality of classes here may be, for example, classes each indicating that the inputted sequential data matches any one of registered persons. Alternatively, the plurality of classes may include a class indicating that impersonation exists in the inputted sequential data, and a class indicating that no impersonation exists in the inputted sequential data.

The biological information acquisition unit 302 is a device that acquires biological information. The biological information acquisition unit 302 may include, for example, a digital camera capable of shooting a video. Note that in identification of biological information, there are some cases where a feature for use in matching is extracted from an image or the like acquired by the biological information acquisition unit 302. Such a feature extraction process may be executed by the classification unit 301, may be executed by the biological information acquisition unit 302 when biological information is acquired, or may be executed by another device. In the following, an image or the like itself acquired by the biological information acquisition unit 302, and a feature extracted from the image or the like are collectively referred to as biological information in some cases.

The biological information storage unit 303 is configured to be able to record each information piece such as biological information used in the individual identification system 300. For example, the biological information acquired by the biological information acquisition unit 302 may be stored in the biological information storage unit 303. The information stored in the biological information storage unit 303 may be stored in a state to be readable by the classification unit 301 when necessary. Moreover, information related to a result of the classification by the classification unit 301 may also be stored in the biological information storage unit 303.

Example of Operation

Next, an example of operation of the individual identification system 300 according to the sixth embodiment is described. In the following, an example is described in which the individual identification system 300 detects impersonation.

As one of impersonation schemes in biometric authentication such as face recognition, there is known a scheme that uses a non-living individual such as a face photograph or a dummy face of an individual. Schemes of detecting such impersonation include a scheme in which a plurality of images are captured and it is determined that an individual is not a living one when a difference between the plurality of images is small. The classification unit 301 in the present embodiment receives, as inputs, time-series images of an authentication target as sequential data, and classifies the sequential data as one of classes indicating presence and absence of impersonation, by using a difference between images for a feature. Thus, impersonation can be detected based on which one of the classes the sequential data is classified as. In such a scheme, changes over time of the images included in the inputted time-series data are very small, and correlation between the images is strong, in many cases. Accordingly, when classification for detecting impersonation is performed, it is effective to use the classification process by the information processing system 10 according to any of the above-described first to fifth embodiments in which classification accuracy hardly deteriorates with respect to sequential data in which elements have strong correlation.

Seventh Embodiment

An information processing system 10 according to a seventh embodiment is described with reference to FIG. 14. Note that the seventh embodiment is to show a basic configuration of the information processing systems according to the above-described first to fifth embodiments, and a configuration and operation of the information processing system 10 according to the seventh embodiment may be similar to those of each embodiment described already. Accordingly, in the following, part different from the first to fifth embodiments is described in detail, and a description of other overlapping part is omitted as appropriate.

Functional Configuration

First, a functional configuration of the information processing system 10 according to the seventh embodiment is described with reference to FIG. 14. FIG. 14 is a block diagram showing the functional configuration of the information processing system according to the seventh embodiment. Note that in FIG. 14, elements similar to the constitutional elements shown in FIG. 2 are denoted by the same reference numbers as in FIG. 2.

Figure 14:
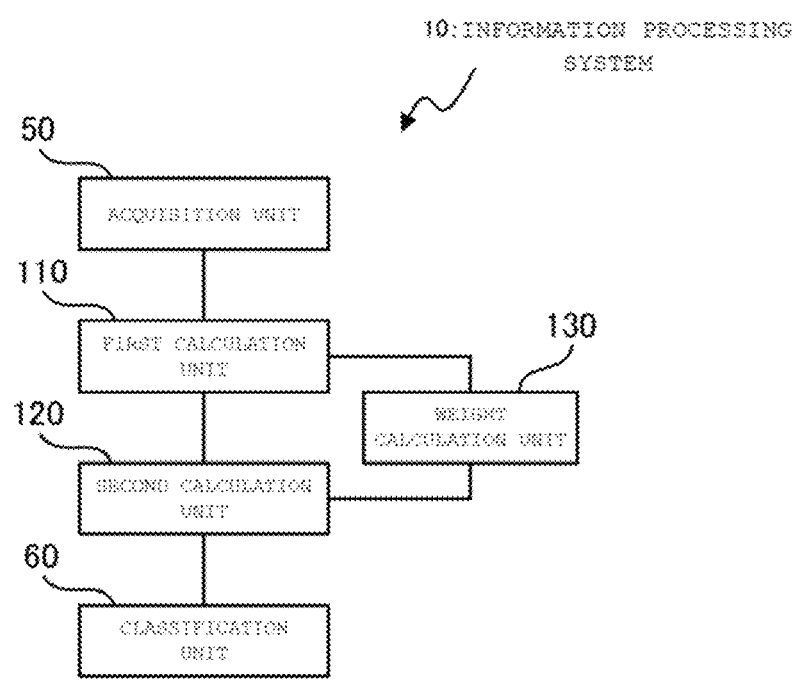
FIG. 14 is a block diagram showing a functional configuration of an information processing system according to a seventh embodiment.

As shown in FIG. 14, the information processing system 10 according to the seventh embodiment includes, as processing blocks for implementing functions of the information processing system 10, an acquisition unit 50, a first calculation unit 110, a second calculation unit 120, a weight calculation unit 130, and a classification unit 60.

The acquisition unit 50 is configured to be able to sequentially acquire a plurality of elements included in sequential data. The first calculation unit 110 is configured to be able to calculate, for each of the plurality of elements included in the sequential data, a first indicator indicating which one of a plurality of classes the element belongs to. The weight calculation unit 130 is configured to be able to calculate a weight according to a confidence related to calculation of the first indicator. The second calculation unit 120 is configured to be able to calculate, based on the first indicators each weighted with the weight calculated by the weight calculation unit 130, a second indicator indicating which one of the plurality of classes the sequential data belongs to. The classification unit 60 is configured to be able to classify the sequential data as any one of the plurality of classes, based on the second indicator calculated by the second calculation unit 120.

Technical Effects

Next, technical effects achieved by the information processing system 10 according to the seventh embodiment are described.

In the information processing system 10 according to the seventh embodiment, by using the first indicator and the second indicator calculated from each element included in sequential data, the sequential data is classified as any one of a plurality of classes. In the seventh embodiment in particular, the second indicator used in classification is weighed with weights each calculated according to a confidence of each element. As a result, the sequential data can be more appropriately classified than in cases where weighting is not performed.

Supplementary Notes

The above-described embodiments can also be further described as, but are not limited to, the following supplements.

Supplementary Note 1

An information processing system described in Supplementary Note 1 is an information processing system including: an acquisition unit configured to sequentially acquire a plurality of elements included in sequential data; a first calculation unit configured to calculate, for each of the plurality of elements, a first indicator indicating which one of a plurality of classes the element belongs to; a weight calculation unit configured to calculate, for each of the plurality of elements, a weight according to a confidence related to calculation of the first indicator; a second calculation unit configured to calculate, based on the first indicators each weighted with the weight, a second indicator indicating which one of the plurality of classes the sequential data belongs to; and a classification unit configured to classify the sequential data as any one of the plurality of classes, based on the second indicator.

Supplementary Note 2

An information processing system described in Supplementary Note 2 is the information processing system described in Supplementary Note 1, wherein the sequential data is image data, and the weight calculation unit is configured to calculate the weight by using, for the confidence, a level of a degree of clarity of the image data, a degree of shortness of a distance between an acquisition unit acquiring the image data and an imaging target, or a timing of acquiring the image data.

Supplementary Note 3

An information processing system described in Supplementary Note 3 is the information processing system described in Supplementary Note 1, wherein the weight calculation unit is configured to calculate the weight by using, for the confidence, a degree of smallness of a difference between the first indicators calculated for two consecutively acquired elements, or a degree of smallness of volatility among the first indicators calculated for a predetermined number of consecutively acquired elements, among the plurality of elements.

Supplementary Note 4

An information processing system described in Supplementary Note 4 is the information processing system described in any one of Supplementary Notes 1 to 3, further comprising a learning unit configured to execute machine learning related to the confidence by using training data associated with the confidence, and to determine the confidence of each of the plurality of elements, based on a result of the machine learning.

Supplementary Note 5

An information processing system described in Supplementary Note 5 is the information processing system described in any one of Supplementary Notes 1 to 4, wherein the first indicator includes a likelihood ratio indicating a likelihood that each of the plurality of elements belongs to a certain class of the plurality of classes.

Supplementary Note 6

An information processing system described in Supplementary Note 6 is the information processing system described in any one of Supplementary Notes 1 to 5, wherein the second indicator includes a likelihood ratio indicating a likelihood that the sequential data belongs to a certain class of the plurality of classes.

Supplementary Note 7

An information processing system described in Supplementary Note 7 is the information processing system described in any one of Supplementary Notes 1 to 6, wherein when a predetermined threshold value for any one class is crossed by the second indicator, the classification unit is configured to classify the sequential data as the class, the predetermined threshold value for which is crossed by the second indicator.

Supplementary Note 8

An information processing system described in Supplementary Note 8 is the information processing system described in any one of Supplementary Notes 1 to 7, wherein when a predetermined threshold value for any of the classes is not crossed by the second indicator, the classification unit is configured not to classify the sequential data as any of the classes, and the acquisition unit is configured to further acquire an element.

Supplementary Note 9

An information processing method described in Supplementary Note 9 is a detection method including: sequentially acquiring a plurality of elements included in sequential data; calculating, for each of the plurality of elements, a first indicator indicating which one of a plurality of classes the element belongs to; calculating, for each of the plurality of elements, a weight according to a confidence related to calculation of the first indicator; calculating, based on the first indicators each weighted with the weight, a second indicator indicating which one of the plurality of classes the sequential data belongs to; and classifying the sequential data as any one of the plurality of classes, based on the second indicator.

Supplementary Note 10

A computer program described in Supplementary Note 10 is a computer program that allows a computer to: sequentially acquire a plurality of elements included in sequential data; calculate, for each of the plurality of elements, a first indicator indicating which one of a plurality of classes the element belongs to; calculate, for each of the plurality of elements, a weight according to a confidence related to calculation of the first indicator; calculate, based on the first indicators each weighted with the weight, a second indicator indicating which one of the plurality of classes the sequential data belongs to; and classify the sequential data as any one of the plurality of classes, based on the second indicator.

Supplementary Note 11

A recording medium described in Supplementary Note 11 is a recording medium on which the computer program described in Supplementary Note 10 is recorded.

Changes can be made to the present disclosure as appropriate within a scope that does not conflict with the gist or the principle of the invention that can be read from the claims and the specification in its entirety, and an information processing system, an information processing method, and a computer program with such changes are also incorporated within the technical idea of the present disclosure.

DESCRIPTION OF REFERENCE CODES

10, 20 Information processing system
11 Processor
50 Acquisition unit
110 First calculation unit
111 First indicator calculation unit
112 First storage unit
113 Likelihood ratio calculation unit
120 Second calculation unit
121 Second indicator calculation unit
122 Second storage unit
123 Consolidated likelihood ratio calculation unit
130 Weight calculation unit
200 Degree-of-reliability learning unit
300 Individual identification system
301 Classification unit
302 Biological information acquisition unit
303 Biological information storage unit

What is claimed is:

1. An information processing system comprising:
at least one memory configured to store instructions; and
at least one processor configured to execute the instructions to:
sequentially acquire a plurality of elements included in sequential data;
calculate, for each of the plurality of elements, a first indicator indicating which one of a plurality of classes the element belongs to;
calculate, for each of the plurality of elements, a weight according to a confidence related to calculation of the first indicator;
calculate, based on the first indicators each weighted with the weight, a second indicator indicating which one of the plurality of classes the sequential data belongs to; and
classify the sequential data as any one of the plurality of classes, based on the second indicator, wherein
the sequential data is image data, and
the weight, calculated for each of the plurality of elements, is calculated by using, for the confidence, a level of a degree of clarity of the image data, a degree of shortness of a distance between an acquisition unit acquiring the image data and an imaging target, or a timing of acquiring the image data.

2. The information processing system according to claim 1, wherein the at least one processor is configured to execute the instructions to calculate the weight by using, for the confidence, a degree of smallness of a difference between the first indicators calculated for two consecutively acquired elements, or a degree of smallness of volatility among the first indicators calculated for a predetermined number of consecutively acquired elements, among the plurality of elements.

3. The information processing system according to claim 1, the at least one processor is further configured to execute the instructions to execute machine learning related to the confidence by using training data associated with the confidence, and to determine the confidence of each of the plurality of elements, based on a result of the machine learning.

4. The information processing system according to claim 1, wherein the first indicator includes a likelihood ratio indicating a likelihood that each of the plurality of elements belongs to a certain class of the plurality of classes.

5. The information processing system according to claim 1, wherein the second indicator includes a likelihood ratio indicating a likelihood that the sequential data belongs to a certain class of the plurality of classes.

6. The information processing system according to claim 1, wherein when a predetermined threshold value for any one class is crossed by the second indicator, the at least one processor is further configured to execute the instructions to classify the sequential data as the class, the predetermined threshold value being set with respect to said one class of the plurality of classes.

7. The information processing system according to claim 1, wherein when a predetermined threshold value for any of the classes is not crossed by the second indicator, the at least one processor is further configured to execute the instructions not to classify the sequential data as any of the classes, and to further acquire an element.

8. An information processing method comprising:
sequentially acquiring a plurality of elements included in sequential data;
calculating, for each of the plurality of elements, a first indicator indicating which one of a plurality of classes the element belongs to;
calculating, for each of the plurality of elements, a weight according to a confidence related to calculation of the first indicator;
calculating, based on the first indicators each weighted with the weight, a second indicator indicating which one of the plurality of classes the sequential data belongs to; and
classifying the sequential data as any one of the plurality of classes, based on the second indicator, wherein
the sequential data is image data, and
the weight, calculated for each of the plurality of elements, is calculated by using, for the confidence, a level of a degree of clarity of the image data, a degree of shortness of a distance between an acquisition unit acquiring the image data and an imaging target, or a timing of acquiring the image data.

9. A non-transitory recording medium on which a computer program is recorded, the computer program allowing a computer to:
sequentially acquire a plurality of elements included in sequential data;
calculate, for each of the plurality of elements, a first indicator indicating which one of a plurality of classes the element belongs to;
calculate, for each of the plurality of elements, a weight according to a confidence related to calculation of the first indicator;
calculate, based on the first indicators each weighted with the weight, a second indicator indicating which one of the plurality of classes the sequential data belongs to; and
classify the sequential data as any one of the plurality of classes, based on the second indicator, wherein
the sequential data is image data, and
the weight, calculated for each of the plurality of elements, is calculated by using, for the confidence, a level of a degree of clarity of the image data, a degree of shortness of a distance between an acquisition unit acquiring the image data and an imaging target, or a timing of acquiring the image data.

\* \* \* \* \*